(12) United States Patent
Yokouchi et al.

(10) Patent No.: US 7,599,519 B2
(45) Date of Patent: Oct. 6, 2009

(54) METHOD AND APPARATUS FOR DETECTING STRUCTURAL ELEMENTS OF SUBJECTS

(75) Inventors: Kouji Yokouchi, Kanagawa-ken (JP); Sadato Akahori, Kanagawa-ken (JP); Kensuke Terakawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 548 days.

(21) Appl. No.: 11/200,148

(22) Filed: Aug. 10, 2005

(65) Prior Publication Data

US 2006/0035259 A1 Feb. 16, 2006

(30) Foreign Application Priority Data

| Aug. 11, 2004 | (JP) | ............................... 2004-234473 |
| Aug. 11, 2004 | (JP) | ............................... 2004-234474 |
| Mar. 11, 2005 | (JP) | ............................... 2005-069530 |
| Aug. 1, 2005 | (JP) | ............................... 2005-222611 |

(51) Int. Cl.
*G06K 9/00* (2006.01)
*H04N 5/222* (2006.01)

(52) U.S. Cl. ................... 382/103; 382/274; 348/333.01
(58) Field of Classification Search ................ 382/103, 382/106, 107, 117, 118, 162, 167, 172, 175, 382/180, 181, 184, 190, 194, 203, 209, 224, 382/232, 255, 274, 275, 276, 286–291, 305, 382/317; 348/333.03, 333.01
See application file for complete search history.

(56) References Cited

U.S. PATENT DOCUMENTS 6,252,976 B1 * 6/2001 Schildkraut et al. ......... 382/117
6,980,691 B2 * 12/2005 Nesterov et al. ............ 382/165
7,035,461 B2 * 4/2006 Luo et al. .................... 382/167
7,224,850 B2 * 5/2007 Zhang et al. ................ 382/275
7,248,300 B1 * 7/2007 Ono ....................... 348/333.03
7,376,270 B2 * 5/2008 Chen et al. .................. 382/167
2003/0108244 A1 6/2003 Li et al.
2004/0233299 A1 11/2004 Ioffey

FOREIGN PATENT DOCUMENTS

| EP | 1 480 168 | 11/2004 |
| JP | 2000-13680 A | 1/2000 |

(Continued)

OTHER PUBLICATIONS

Kazuo Matsumoto, et al., "Detection of Malignant Tumors in DR Images—Iris Filter", Journal of Electronic Information Society, vol. J75-D11, 1992, 18 pages.
European Communication for Application No. 05017302.0-2202 PCT/dated Oct. 18, 2005.

(Continued)

*Primary Examiner*—Seyed Azarian
(74) *Attorney, Agent, or Firm*—Sughrue Mion, PLLC

(57) ABSTRACT

Structural element candidates, estimated to be predetermined structural elements of a predetermined subject, are detected from an image that includes the subject. The subject that includes the structural element candidates is detected from the image in the vicinity of the detected structural element candidates. The characteristics of the structural elements are discriminated from the image in the vicinity of the structural element candidates, at a higher accuracy than when the structural elements were detected. In the case that the characteristics of the structural elements are discriminated, the structural element candidates are confirmed as being the predetermined structural elements.

101 Claims, 12 Drawing Sheets

FOREIGN PATENT DOCUMENTS

| | | |
|---|---|---|
| JP | 2000-125320 A | 4/2000 |
| JP | 2001-148780 A | 5/2001 |
| JP | 20040109614 A1 * | 6/2004 |

OTHER PUBLICATIONS

Joffe S Ed—Institute of Electrical and Electronics Engineers: "Red eye detection with machine learning" Proceedings 2003 International Conference on Image Processing. ICIP-2003. Barcelona, Spain, Sep. 14-17, 2003. International Conference on Image Processing, New York, NY: IEEE, US, vol. vol. 2 of 3 Sep. 14, 2003, pp. 871-874, XP010670596 ISBN: 0-7803-7750-8 the whole document.

Camus T A et al: "Reliable and fast eye finding in close-up images" Pattern Recognition, 2002. Proceedings. 16th International Conference on Quebec City, Que., Canada Aug. 11-15, 2002, Los Alamitos, CA, USA, IEEE Comput. Soc, US, vol. 1, Aug. 11, 2002, pp. 389-394, XP010613355 ISBN: 0-7695-1695-X p. 391, right-hand col., lines 12-16.

* cited by examiner

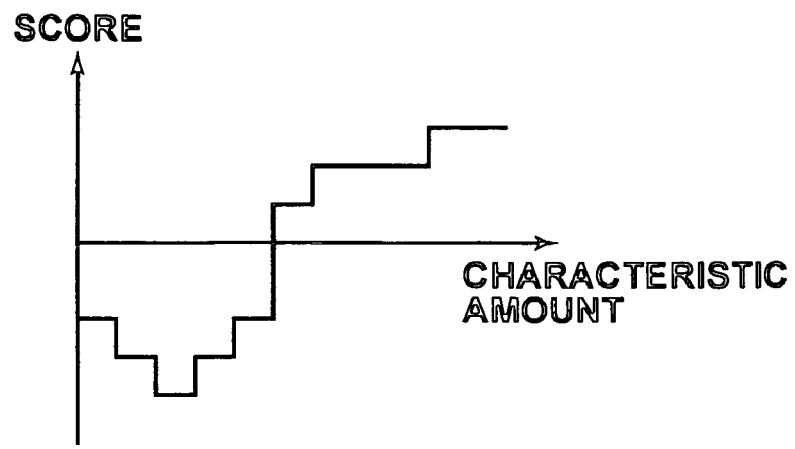

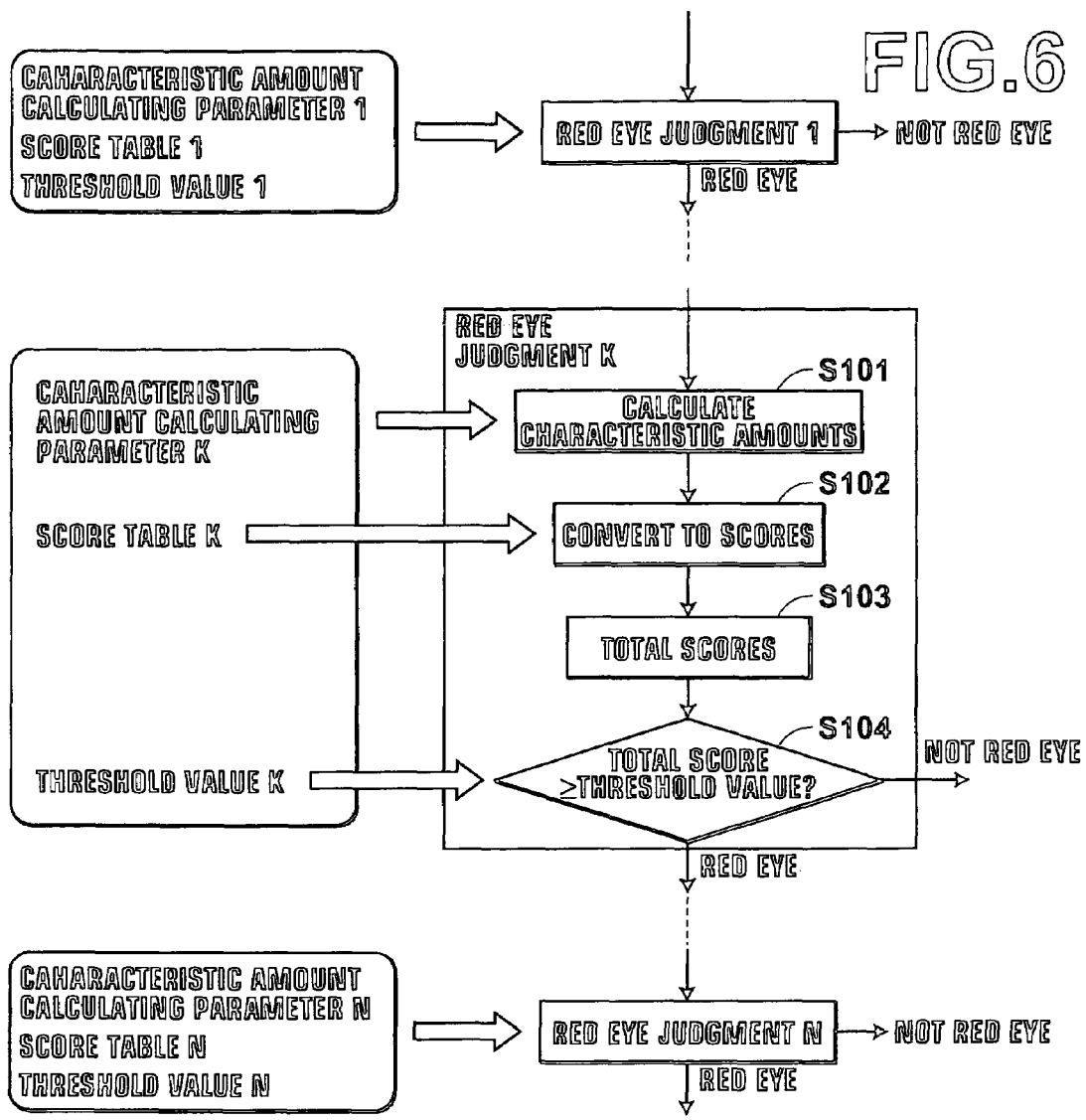
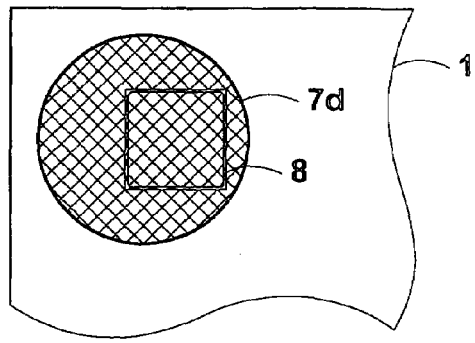
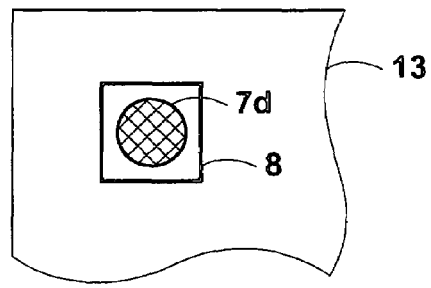

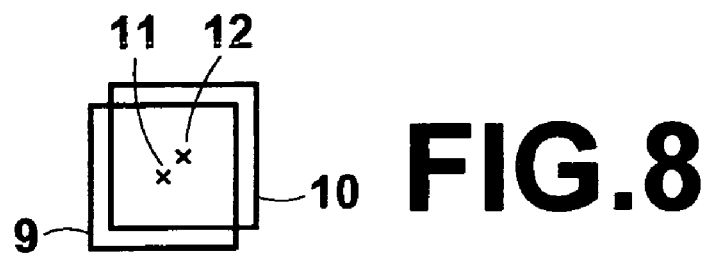

LEVEL 0    LEVEL 1    LEVEL 2

EXTRACT PIXELS

SHAPE PIXELS

CONVERT COLORS

METHOD AND APPARATUS FOR DETECTING STRUCTURAL ELEMENTS OF SUBJECTS

BACKGROUND OF THE INVENTION

1. Field of the Invention

The present invention relates to a structural element detecting method, a structural element detecting apparatus, and a structural element detecting program, for detecting predetermined structural elements, which are included in predetermined subjects, from within images that include the predetermined subjects.

2. Description of the Related Art

There are cases in which pupils (or portions of pupils) of people or animals, photographed by flash photography at night or in dark places, are photographed as being red or gold. For this reason, various methods for correcting the color of pupils, which have been photographed as being red or gold (hereinafter, cases in which pupils are photographed as being gold are also referred to as "red eye"), to normal pupil colors by digital image processing have been proposed.

For example, Japanese Unexamined Patent Publication No. 2000-013680 discloses a method and apparatus for automatically discriminating red eyes. This method and apparatus automatically discriminate red eyes based on colors, positions, and sizes of pupils within a region specified by an operator. Japanese Unexamined Patent Publication No. 2001-148780 discloses a method wherein: predetermined characteristic amounts are calculated for each pixel within a region specified by an operator; and portions having characteristics that correspond to pupil portions are selected as targets of correction. However, in discriminating processes which are based solely on characteristics of pupil portions, it is difficult to discriminate targets having local redness, such as red lighting, from red eyes. For this reason, it is difficult for this process to be executed automatically, without operator intervention.

On the other hand, Japanese Unexamined Patent Publication No. 2000-125320 discloses a method wherein: faces are detected first; and red eye detection is performed within regions detected to be faces. In this method, false positives, such as red lights being detected as red eyes, does not occur. However, if errors occur during face detection, red eyes cannot be accurately detected. Therefore, the accuracy of the facial detection becomes an issue.

The simplest method for detecting faces is to detect oval skin colored regions as faces. However, people's faces are not necessarily uniform in color. Therefore, it is necessary to broadly define "skin color", which is judged to be the color of faces. However, the possibility of false positive detection increases in the case that the range of colors is broadened in a method that judges faces based only on color and shape. For this reason, it is preferable that faces are judged utilizing finer characteristics than just the color and the shapes thereof, in order to improve the accuracy of facial detection. However, if characteristics of faces are extracted in detail, the time required for facial detection processes greatly increases.

That is, the method disclosed in Japanese Unexamined Patent Publication No. 2000-125320 is capable of detecting red eyes with high accuracy, yet gives no consideration to processing time. In the case that the method is applied to an apparatus having comparatively low processing capabilities (such as a low cost digital camera), the apparatus cannot function practically.

SUMMARY OF THE INVENTION

The object of the present invention is to provide a method, apparatus, and program which are capable of accurately detecting structural elements (such as eyes and red eyes) of predetermined subjects (such as faces of living organisms, for example, humans and animals) from within images that include the predetermined subjects, with a small amount of calculations in a short period of time. To achieve this object, the present invention provides processes, to be described below, to be performed by a structural element detecting apparatus, a structural element detecting method, and a structural element detecting program. Note that in the description below, "apparatus" includes semiconductor devices, such as image processors, in addition to conventional devices. In addition, the term "computer" refers not only to personal computers and servers, but also includes any device capable of executing programs, that is, having calculating means and memory means.

The first structural element detecting apparatus of the present invention is a structural element detecting apparatus for detecting predetermined structural elements included in predetermined subjects from within images that include the subjects, characterized by comprising: a structural element candidate detecting section; a subject detecting section; and a structural element confirming section. The structural element candidate detecting section detects structural element candidates, by discriminating characteristics inherent to the predetermined structural elements, from among characteristics of the images. The subject detecting section detects subjects that include the structural element candidates, by discriminating characteristics inherent to the predetermined subjects, from among characteristics of the images in the vicinities of the structural elements candidates. The structural element confirming section confirms that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within subjects detected by the subject detecting section.

The first structural element detecting method of the present invention is a structural element detecting method for detecting predetermined structural elements included in predetermined subjects from within images that include the subjects, characterized by comprising: a first structural element candidate detecting process; a first subject detecting process; and a structural element confirming process. The first structural element candidate detecting process detects structural element candidates, by discriminating characteristics inherent to the predetermined structural elements, from among characteristics of the images. The first subject detecting process detects subjects that include the structural element candidates, by discriminating characteristics inherent to the predetermined subjects, from among characteristics of the images in the vicinities of the structural element candidates. The structural element confirming process confirms that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within the subjects detected by the subject detecting section.

The structural element detecting program of the present invention is a program that provides a function of detecting predetermined structural elements included in predetermined subjects from within images that include the subjects. The program is characterized by causing a computer to execute: a first structural element candidate detecting process; a first subject detecting process; and a structural element confirming process. The first structural element candidate detecting process detects structural element candidates, by discriminating characteristics inherent to the predetermined structural elements, from among characteristics of the images. The first subject detecting process detects subjects that include the structural element candidates, by discriminating characteristics inherent to the predetermined subjects, from among characteristics of the images in the vicinities of the structural element candidates. The structural element confirming process confirms that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within the subjects detected by the subject detecting section.

In the structural element confirming process, data regarding faces detected by the face detecting section may be utilized, in order to perform discrimination at a higher degree of accuracy that that of the structural element candidate detecting process. Specifically, characteristics inherent to structural elements having the same orientations as those of detected subjects may be discriminated from among the characteristics of images in the vicinities of structural element candidates, and structural element candidates having such characteristics may be confirmed to be the predetermined structural elements, for example. Alternatively, characteristics inherent to structural elements having sizes estimated from the sizes of detected subjects may be discriminated, and structural element candidates having such characteristics may be confirmed to be the predetermined structural elements. As a further example, characteristics inherent to structural candidates having the same orientations as those of detected subjects and which are of sizes estimated from the sizes of detected subjects may be discriminated, and structural element candidates that satisfy predetermined conditions regarding the orientations and sizes thereof maybe confirmed to be the predetermined structural elements. If the orientations and sizes are limited, the target ranges for discrimination are narrowed. If structural element candidates are discriminated within the narrow target ranges, the probability that these structural element candidates are the predetermined structural elements is high.

The reliability of detection results can be further improved, by performing the following processes after the structural element candidates are confirmed to be the predetermined structural elements. First, the number of structural element candidates, detected by a first structural element candidate detecting process and confirmed as being the predetermined structural elements, are compared against the maximum number of structural elements which are possibly included within the subjects detected by the subject detecting section. In the case that the subjects are front facing faces, and the structural elements to be detected are red eyes, a maximum of two red eyes are possibly included in the front facing faces. In this case, the maximum number of structural elements, which are possibly included in the subject, is 2.

A second structural element candidate detecting process, having a higher detection rate than the first structural element candidate detecting process, is executed in the case that number of structural element candidates, which have been confirmed to be structural elements by the structural element confirming section, is less than the maximum number. Then, the structural element confirming process is executed with respect to the newly detected structural element candidates.

It is desirable that the confirmation of the structural elements is not limited to judging whether the structural element candidates are the predetermined structural elements. That is, it is desirable that accurate positions of the structural elements are specified and confirmed, based on information obtained during the discrimination processes.

It is desirable that the structural element candidate detecting section is capable of executing a plurality of structural element candidate detecting processes, which have different detection rates. In this case, it is desirable that a second structural element candidate detecting process, having a higher detection rate than a first structural element candidate detecting process, is executed in the case that number of structural element candidates, which have been detected by the first structural element candidate detecting process and confirmed to be the predetermined structural elements by the structural element confirming section, is one or less. Further, it is desirable that the subject detecting process and the structural element confirming process are executed with respect to the structural element candidates, which have been detected by the second structural element candidate detecting process.

The structural element detecting process realized by the method, apparatus, and program for structural element detection of the present invention comprises the following steps. First, structural element candidates are detected in the structural element candidate detecting step. Then, the vicinities of the structural element candidates are set to be search ranges for detecting structural elements in the structural element confirming step. The structural element confirming step discriminates the structural elements with higher accuracy than in the structural element candidate detecting step, by utilizing information regarding the detected subjects, for example. Therefore, the accuracy in judging whether the structural element candidates are the predetermined structural elements is higher than the detection accuracy during the structural element candidate detecting step. Thereby, structural element candidates detected during the structural element candidate detecting step, which are false positive detections, can be eliminated.

Highly accurate judgment is performed during the structural element confirming step, by obtaining more information during the discrimination process than during the structural element candidate detecting step. Therefore, the positions of the structural element candidates may be accurately specified by utilizing the obtained information.

The apparatus, method and program described above execute processes to detect the structural elements and the subjects, based on characteristic amounts included in images. Specifically, the first structural element candidate detecting process, the first subject detecting process, and the highly accurate structural element detecting process to confirm the structural elements, are performed. In a further preferred embodiment, the second structural element candidate detecting process and the second subject detecting process are performed.

The present invention further provides a second apparatus, a second method, and a second program for efficiently detecting detection targets, such as structural elements and subjects. The second apparatus and the second method to be described below may be incorporated into the first structural element detecting apparatus and the first structural element detecting method of the present invention described above. Further, the second apparatus and the second method may be applied to other apparatuses and methods for detecting detection targets.

The second apparatus of the present invention comprises: target region setting means, for setting judgment target regions within an image; and judging means, for judging whether images within the judgment target regions set by the target region setting means represent detection targets (the predetermined structural elements or the predetermined subjects), based on a plurality of characteristic amounts, which are calculated from pixel values of pixels that constitute the images within the judgment target regions.

The judging means classifies and records formulas for calculating the plurality of characteristic amounts into N groups (N>1), such that the amount of calculations required to obtain characteristic amounts by formulas in a $K^{th}$ group ($1 \leq K < N$) is less than the amount of calculations required to obtain characteristic amounts by formulas in a $K+1^{st}$ group. By employing these formulas, the judging means performs judgments as follows.

In the case that it is judged that the image within the judgment target region does not represent a detection target, based on characteristic amounts obtained by formulas in a $K^{th}$ group, the judging means outputs judgment results indicating that an image within a judgment target region does not represent the detection target. On the other hand, in the case that it is judged that an image within a judgment target region represents the detection target, based on characteristic amounts obtained by formulas in a $K^{th}$ group, the judging means performs judgment, based on characteristic amounts obtained by formulas in a $K+1^{st}$ group, with respect to the judgment target region.

Then, in the case that it is judged that the image within the judgment target region represents the detection target, based on characteristic amounts obtained by formulas in the $N^{th}$ group, the judging means outputs judgment results indicating that the image within the judgment target region represents the detection target.

The judging means may perform first judgment, based on the characteristic amounts obtained by formulas in a $K^{th}$ group, with respect to a plurality of judgment target regions set by the target region setting means; and then perform second judgment, based on the characteristic amounts obtained by formulas in a $K+1^{st}$ group, with respect to judgment target regions, which have been judged to represent the detection targets by the first judgment.

The judgment target regions may be set such that the positions of judgment target regions closest to each other are shifted at least two pixels, during at least a portion of the judgments performed by the judging means.

The judging means may perform first judgment, based on characteristic amounts obtained by formulas in a $K^{th}$ group, with respect to judgment target regions, which are set within an image represented at a predetermined resolution; and then perform second judgment, based on characteristic amounts obtained by formulas in a $K+1^{st}$ group, with respect to the judgment target regions, which are set within the image represented at a higher resolution than that of the first judgment.

The judging means may perform first judgment, based on the characteristic amounts obtained by formulas in a $K^{th}$ group, with respect to the plurality of judgment target regions set by the target region setting means; and then perform second judgment, based on the characteristic amounts obtained by formulas in a $K+1^{st}$ group, with respect to a plurality of judgment target regions, which are set such that at least a portion thereof overlaps with judgment target regions that have been judged to represent red eye by the first judgment.

At this time, at least one of the formulas for calculating characteristic amounts classified in a $K^{th}$ group may also be included in a $K+1^{st}$ group.

The construction described above may be described as procedural steps in the following manner.

First, formulas for calculating the plurality of characteristic amounts are classified and organized into N groups (N>1), such that the amount of calculations required to obtain characteristic amounts by formulas in a $K^{th}$ group ($1 \leq K < N$) is less than the amount of calculations required to obtain characteristic amounts by formulas in a $K+1^{st}$ group.

In the case that it is judged that the image within the judgment target region does not represent a detection target, based on characteristic amounts obtained by formulas in a $K^{th}$ group, judgment results indicating that an image within a judgment target region does not represent the detection target are output. On the other hand, in the case that it is judged that an image within a judgment target region represents the detection target, based on characteristic amounts obtained by formulas in a $K^{th}$ group, judgment is performed, based on characteristic amounts obtained by formulas in a $K+1^{st}$ group, with respect to the judgment target region.

Then, in the case that it is judged that the image within the judgment target region represents the detection target, based on characteristic amounts obtained by formulas in the $N^{th}$ group, judgment results indicating that the image within the judgment target region represents the detection target are output.

The procedural steps described above may be described as a program executed by a computer in the following manner.

Formulas for calculating the plurality of characteristic amounts are classified and organized into N groups (N>1), such that the amount of calculations required to obtain characteristic amounts by formulas in a $K^{th}$ group ($1 \leq K < N$) is less than the amount of calculations required to obtain characteristic amounts by formulas in a $K+1^{st}$ group. The program performs judgments by utilizing these formulas.

The program causes a computer to output judgment results indicating that an image within a judgment target region does not represent a detection target, in the case that the computer judges that the image within the judgment target region does not represent the detection target, based on characteristic amounts obtained by formulas in a $K^{th}$ group.

On the other hand, in the case that the computer judges that an image within a judgment target region represents the detection target, based on characteristic amounts obtained by formulas in a $K^{th}$ group, the computer is caused to perform judgment, based on characteristic amounts obtained by formulas in a $K+1^{st}$ group, with respect to the judgment target region.

Then, in the case that the computer judges that the image within the judgment target region represents the detection target, based on characteristic amounts obtained by formulas in the $N^{th}$ group, the computer is caused to output judgment results indicating that the image within the judgment target region represents the detection target.

In the judging method described above, judging processes that are executed often are performed employing characteristic amounts that require small amounts of calculations. Characteristic amounts, which are higher in accuracy but require greater amounts of calculations, are only utilized in judgment processes targeting limited regions. Therefore, can-

BRIEF DESCRIPTION OF THE DRAWINGS

FIG. 4 illustrates an example of the definition (score table) of the relationship between characteristic amounts and scores.

FIGS. 5A, 5B, 5C, 5D, and 5E illustrate examples of red eye learning samples.

FIG. 6 is a flow chart that illustrates N types of judging processes.

FIGS. 7A and 7B are diagrams for explaining the relationship between red eye detection and image resolution.

FIG. 8 is a diagram for explaining a process which is performed with respect to red eye candidates which have been redundantly detected.

FIGS. 9A and 9B illustrate examples of methods for calculating characteristic amounts.

DESCRIPTION OF THE PREFERRED EMBODIMENTS

Hereinafter, a procedure will be described, in which red eyes are detected as structural components from images that include human faces as subjects.

[Outline of Red Eye Detecting Procedure]

Figure 1:
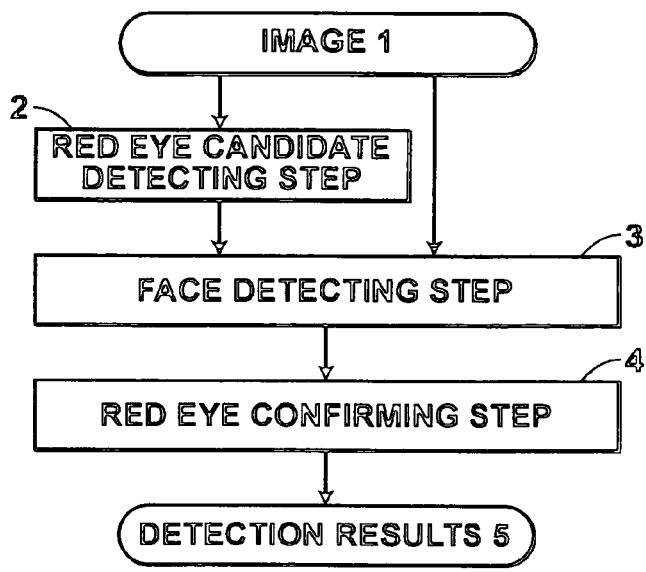
FIG. 1 illustrates the procedures of red eye detection in a first embodiment.

First, the outline of a red eye detecting process will be described with reference to FIG. 1 and FIG. 2. FIG. 1 illustrates the steps of red eye detection. As illustrated in FIG. 1, the present embodiment detects red eyes included in an image 1, by executing a three step process, comprising a red eye candidate detecting step 2, a face detecting step 3, and a red eye confirming step 4. Information representing accurate positions of red eyes is obtained, as detection results 5.

In the case that the number of red eyes confirmed by the red eye confirming step 4 is one or less (none, or only one) even if the face detected by the face detecting step 3 is a front facing face, a second red eye candidate detecting step, which has a higher degree of accuracy than the red eye candidate detecting step 2 is performed. Then, the face detecting step 3 and the red eye confirming step 4 are performed with respect to the red eye candidates which have been detected by the second red eye candidate detecting step. In the present specification, the series of processes described above, performed in the case that the number of red eyes confirmed by the red eye confirming step 4 is one or less, will be referred to as a redetection process.

Figure 2:
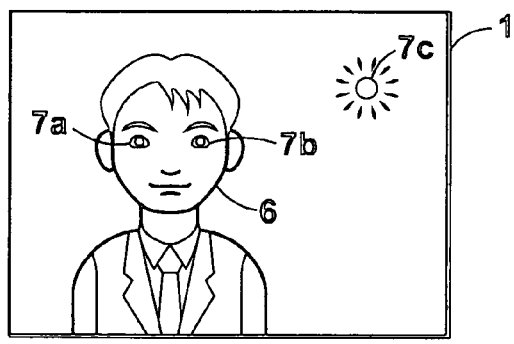
FIG. 2 illustrates an example of an image, which is a target for red eye detection.

FIG. 2 illustrates an example of the image 1. The image 1 is a photographic image, in which a person has been photographed with red eyes 7a and 7b. A red light 7c is also pictured in the photographic image. Hereinafter, the outline of the red eye candidate detecting step 2, the face detecting step 3 and the red eye confirming step 4 will be described for the case that the image of FIG. 2 is processed, as an example.

The red eye detecting step 2 searches for portions of the image 1 which are estimated to be red eyes (red eye candidates). In cases in which red eye candidates are found, the positional coordinates of the red eye candidates are recorded in a memory medium. Because red eyes, of which the sizes and orientations are unknown, are to be detected from the entirety of the image 1 in the red eye candidate detecting step 2, processing efficiency is prioritized above detection accuracy. In the present embodiment, the red eye candidate detecting step 2 judges that pupils exist, based only on the characteristics thereof. For this reason, in the case that the image of FIG. 2 is processed, there is a possibility that the light 7c in the background is detected as a red eye candidate, in addition to the red eyes 7a and 7b.

The face detecting step 3 searches for portions, which are estimated to be faces, from within the image 1. However, the search for the faces is performed only in the peripheral regions of the red eye candidates, which have been detected in the red eye candidate detecting step 2. In the case that the red eye candidates are true red eyes, faces necessarily exist in their peripheries. In the case that portions which are likely to be faces are found during the face detecting step 3, information, such as the size of the face and the orientation thereof, are recorded in the memory medium, correlated with the red eye candidates that served as the reference points for the face search. On the other hand, in the case that no portions which are likely to be faces are found, information relating to the red eye candidates that served as the reference points for the face search is deleted from the memory medium.

In the case that the image of FIG. 2 is processed, no portion which is likely to be a face is detected in the periphery of the light 7c. Therefore, information regarding the light 7c is deleted form the memory medium. A face 6 is detected in the periphery of the red eyes 7a and 7b. Accordingly, information relating to the red eyes 7a and 7b are correlated with information regarding the face 6, and rerecorded in the memory medium.

The red eye confirming step 4 judges whether the red eye candidates, which have been correlated with faces in the face detecting step 3, are true red eyes. In the case that the candidates are true red eyes, their positions are also accurately confirmed.

The red eye confirming step 4 utilizes the results of the face detecting step 3. Specifically, information regarding detected faces are utilized to estimate sizes and orientations of red eyes, thereby narrowing down regions which are likely to be red eyes. Further, the positions of red eyes are estimated based on information regarding the detected faces. Then, a detection process having higher accuracy than that of the red eye candidate detecting step 2 is executed within limited regions in the peripheries of the positions.

In the case that red eye candidates are judged not to be true red eyes during the red eye confirming step 4, information relating to the red eye candidates is deleted from the memory medium. On the other hand, in the case that red eye candidates are judged to be true red eyes, the accurate positions thereof are obtained.

The positions of red eye candidates are evaluated utilizing the information regarding the detected faces in the red eye confirming step 4. In the case that the red eye candidates are located at positions which are inappropriate for eyes within faces, information relating to the red eye candidates is deleted from the memory medium.

For example, in the case that a red circular mark is painted on a person's forehead, the red eye candidate detecting step 2 will detect the mark as a red eye candidate, and the face detecting step 3 will detect a face in the periphery of the mark. However, it will be judged that the red eye candidate is located in the forehead, which is an inappropriate position for eyes, during the red eye confirming step 4. Therefore, information relating to the red eye candidate is deleted from the memory medium.

In the case of the image of FIG. 2, the accurate positions of the red eyes 7a and 7b are confirmed in the red eye confirming step 4. The red eye confirming step outputs the positional coordinates of the confirmed red eyes as detection results 5.

An apparatus for detecting red eyes by the above process may be realized by loading a program that causes execution of each of the aforementioned steps into an apparatus comprising: a recording medium, such as a memory unit; a calculating means for executing processes defined by the program; and an input/output interface for controlling data input from external sources and data output to external destinations.

Alternatively, an apparatus for detecting red eyes by the above process may be realized by incorporating a memory/logic device, designed to execute the red eye candidate detecting step 2, the face detecting step 3, and the red eye confirming step 4, into a predetermined apparatus.

In other words, not only general use computers, but any apparatus, in which programs or semiconductor devices can be loaded, even if they are built for other specific uses, may function as an apparatus for detecting red eyes by the above process. Examples of such apparatuses are digital photographic printers and digital cameras.

[Red Eye Candidate Detecting Step]

Next, the red eye candidate detecting step 2 (a first structural element candidate detecting step) will be described in detail. During the red eye candidate detecting step 2, the red eye detecting apparatus first converts the color space of an obtained image. Specifically, display color system of the image is converted, by replacing the R (red), G (green), and B (blue) values of each pixel in the image with Y (luminance), Cb (color difference between green and blue), Cr (color difference between green and red), and Cr* (color difference between skin color and red) by use of predetermined conversion formulas.

YCbCr is a coordinate system which is commonly utilized in JPEG images. Cr* is a coordinate axis that represents a direction in which red and skin color are best separated within an RGB space. The direction of this coordinate axis is determined in advance, by applying a linear discriminant analysis method to red samples and skin colored samples. By defining this type of coordinate axis, the accuracy of judgment, to be performed later, is improved compared to cases in which judgment is performed within a normal YCbCr space.

Figure 3:
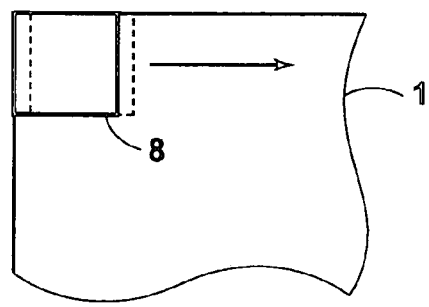
FIG. 3 is an enlarged view of a portion of an image, which is a target for red eye detection.

FIG. 3 is a magnified view of a portion of the image 1, which has been color space converted. The red eye detecting apparatus sets a judgment target region 8 on the image 1, as illustrated in FIG. 3. The red eye detecting apparatus examines the image within the judgment target region 8 to determine how many characteristics of red eye are present therein. In the present embodiment, the size of the judgment target region 8 is 10 pixels×10 pixels.

The determination regarding how many characteristics of red eye are present within the judgment target region 8 is performed in the following manner. First, characteristic amounts that represent likelihood of being red eyes, scores corresponding to the value of the characteristic amounts, and a threshold value are defined in advance. For example, if pixel values are those that represent red, that would be grounds to judge that red eye exists in the vicinity of the pixels. Accordingly, pixel values may be characteristic amounts that represent likelihood of being red eyes. Here, an example will be described, in which pixel values are defined as the characteristic amounts.

The score is an index that represents how likely red eyes exist. Correlations among scores and characteristic amounts are defined. In the case of the above example, pixel values, which are perceived to be red by all viewers, are assigned high scores, while pixel values, which may be perceived to be red by some viewers and brown by other viewers, are assigned lower scores. Meanwhile, pixel values that represent colors which are clearly not red (for example, yellow) are assigned scores of zero or negative scores. FIG. 4 is a score table that illustrates an example of the correspondent relationship between characteristic amounts and scores.

Whether the image within the judgment target region 8 represents red eyes is judged in the following manner. First, characteristic amounts are calculated for each pixel within the judgment target region 8. Then, the calculated characteristic amounts are converted to scores, based on definitions such as those exemplified in the score table of FIG. 4. Next, the scores of all of the pixels within the judgment target region 8 are totaled. If the total value of the scores is greater than or equal to the threshold value, the subject of the image within the judgment target region is judged to be a red eye. If the total value of the scores is less than the threshold value, it is judged that the image does not represent a red eye.

As is clear from the above description, the accuracy of judgment in the above process depends greatly on the definitions of the characteristic amounts, the score table, and the threshold value. For this reason, the red eye detecting apparatus of the present embodiment performs learning, employing sample images of red eyes and sample images of other subjects (all of which are 10 pixels×10 pixels). Appropriate characteristic amounts, score tables, and threshold values, which are learned by the learning process, are employed in judgment.

Various known learning methods, such as a neural network method, which is known as a machine learning technique, and a boosting method, may be employed. Images, in which red eyes are difficult to detect, are also included in the sample images utilized in the learning process.

For example, the sample images utilized in the learning process may include: standard sample images, as illustrated in FIG. 5A; images in which the size of the pupil is smaller than that of standard sample images, as illustrated in FIG. 5B; images in which the center position of the pupil is misaligned, as illustrated in FIG. 5C; and images of incomplete red eyes, in which only a portion of the pupil is red, as illustrated in FIGS. 5D and 5E.

The sample images are utilized in the learning process, and effective characteristic amounts are selected from among a plurality of characteristic amount candidates. The judgment process described above is repeated, employing the selected characteristic amounts and score tables generated therefor. The threshold value is determined so that a predetermined percentage of correct judgments is maintained during the repeated judgments.

At this time, the red eye detecting apparatus of the present embodiment performs N types of Judgment (N is an integer greater than or equal to 2) on individual judgment target regions, utilizing N types of characteristic amounts, score tables, and threshold values. The coordinates of judgment target regions are registered in a red eye candidate list only in cases in which all of the N judgments judge that red eye is present. That is, the accuracy of judgment is improved by combining the plurality of types of characteristic amounts, score tables, and threshold values, and only reliable judgment results are registered in the list. Note that here, "registered in a red eye candidate list" refers to recording positional coordinate data and the like in the memory medium.

FIG. 6 is a flow chart that illustrates the N types of judgment processes. As illustrated in FIG. 6, the red eye detecting apparatus first performs a first judgment on a set judgment target region, referring to a first type of characteristic amount calculating parameters, score table and threshold value. The characteristic amount calculating parameters are parameters, such as coefficients, that define a calculation formula for characteristic amounts.

In the case that the first red eye judgment process judges that red eye exists, the same judgment target region is subjected to a second judgment, referring to a second type of characteristic amount calculating parameters, score table, and threshold value. In the case that the first red eye judgment process judges that red eye is not present, it is determined at that point that the image within the judgment target region does not represent red eye, and a next judgment target region is set.

Thereafter, in cases that red eye is judged to exist by a $(K-1)^{th}$ judgment process ($2 \leq K \leq N$), the same judgment target region is subjected to a $K^{th}$ judgment process, referring to a $K^{th}$ type of characteristic amount calculating parameters, score table, and threshold value. In cases that a $(K-1)^{th}$ judgment process judges that red eye is not present, then judgment processes for that judgment target region are ceased at that point.

Note that at each judgment, characteristic amounts are calculated for each pixel (step S101), the characteristic amounts are converted to scores (step S102), and the scores of all of the pixels within the judgment target region are totaled (step S103). If the total value of the scores is greater than or equal to the threshold value, the subject of the image within the judgment target region is judged to be a red eye; and if the total value of the scores is less than the threshold value, it is judged that the image does not represent a red eye (step S104).

The red eye detecting apparatus registers coordinates of judgment target regions in a red eye candidate list, only in cases in which an N-th judgment, which refers to an N-th type of characteristic amount calculating parameter, score table, and threshold value, judges that red eye is present.

In the judgment process described above, it is assumed that red portions included in the image 1 are of sizes that fit within a 10 pixel×10 pixel region. In actuality, however, there are cases in which a red eye 7d included in the image 1 is larger than the 10 pixel×10 pixel judgment target region 8, as illustrated in FIG. 7A. For this reason, the red eye detecting apparatus of the present embodiment performs the aforementioned judgment processes not only on the image 1 input thereto, but on a low resolution image 13, generated by reducing the resolution of the image 1, as well.

As illustrated in FIG. 7B, if the resolution of the image 1 is reduced, the red eye 7d fits within the 10 pixel×10 pixel judgment target region 8. It becomes possible to perform judgments on the low resolution image 13 employing the same characteristic amounts and the like as those which were used in the judgments performed on the image 1. The image having a different resolution may be generated at the point in time at which the image 1 is input to the red eye detecting apparatus. Alternatively, resolution conversion may be administered on the image 1 as necessary during execution of the red eye candidate detecting step.

Note that judgments may be performed by moving the judgment target region 8 in small increments (for example, 1 pixel). In these cases, a single red eye may be redundantly detected by judgment processes for different judgment target regions 9 and 10, as illustrated in FIG. 8. The single red eye may be registered in the red eye candidate list as separate red eye candidates 11 and 12. There are also cases in which a single red eye is redundantly detected during detecting processes administered on images having different resolutions.

For this reason, the red eye detecting apparatus of the present embodiment confirms the coordinate information registered in the red eye candidate list after scanning of the judgment target region is completed for all images having different resolutions. In cases that a plurality of pieces of coordinate information that clearly represent the same red eye are found, only one piece of the coordinate information is kept, and the other pieces are deleted from the list. Specifically, the piece of coordinate information that represents the judgment target region having the highest score total is kept as a red eye candidate, and the other candidates are deleted from the list.

The red eye candidate list, which has been organized as described above, is output as processing results of the red eye candidate detecting step 2, and utilized in the following face detecting step 3.

In the red eye candidate detecting step of the present embodiment, processing time is reduced without decreasing the accuracy of detection. This is accomplished by adjusting the resolution of images employed in the detection, the manner in which the judgment target regions are set, and the order in which the N types of characteristic amount calculating parameters are utilized. Hereinafter, methods for improving the processing efficiency of the red eye candidate detecting step will be described further.

[Methods for Improving Red Eye Candidate Detection Efficiency]

The methods for improving the efficiency of the red eye candidate detecting step described below may be employed either singly or in combinations with each other.

A first method is a method in which characteristic amounts are defined such that the amount of calculations is reduced for judgments which are performed earlier, during the N types of judgment As has been described with reference to FIG. 6, the red eye detecting apparatus of the present embodiment does not perform $(K+1)^{th}$ judgment processes in cases in which the $K^{th}$ judgment process judges that red eye is not present. This means that judgment processes, which are performed at earlier stages, are performed more often. Accordingly, by causing the processes which are performed often to be those that involve small amounts of calculations, the efficiency of the entire process can be improved.

The definition of the characteristic amounts described above, in which the characteristic amounts are defined as the values of pixels (x, y), is the example that involves the least amount of calculations.

Another example of characteristic amounts which may be obtained with small amounts of calculations is differences between pixel values (x, y) and pixel values (x+dx, y+dy). The differences between pixel values may serve as characteristic amounts that represent likelihood of being red eyes, because colors in the periphery of pupils are specific, such as white (whites of the eyes) or skin color (eyelids). Similarly, combinations of differences between pixel values (x, y) and pixel values (x+dx1, y+dy1) and differences between pixel values (x, y) and pixel values (x+dx2, y+dy2) may also serve as characteristic amounts that represent likelihood of being red eyes. Combinations of differences among four or more pixel values may serve as characteristic amounts. Note that values, such as dx, dx1, dx2, dy, dy1, and dy2, which are necessary to calculate the characteristic amounts, are recorded as characteristic amount calculating parameters.

As an example of characteristic amounts that require more calculations, averages of pixel values within a 3×3 pixel space that includes a pixel (x, y) may be considered. Combinations of differences among pixel values in the vertical direction and the horizontal direction, within a 3×3 pixel space having a pixel (x, y) at its center, may also serve as characteristic amounts. The difference among pixel values in the vertical direction may be obtained by calculating weighted averages of the 3×3 pixels, employing a filter such as that illustrated in FIG. 9A. Similarly, the difference among pixel values in the horizontal direction may be obtained by calculating weighted averages of the 3×3 pixels, employing a filter such as that illustrated in FIG. 9B. As examples of characteristic amounts that involve a similar amount of calculations, there are: integral values of pixels which are arranged in a specific direction; and average values of pixels which are arranged in a specific direction.

There are characteristic amounts that require even more calculations. Gradient directions of pixels (x, y), that is, the directions in which the pixel value (color density) changes, may be obtained from values calculated by employing the filters of FIGS. 9A and 9B. The gradient directions may also serve as characteristic amounts that represent likelihood of being red eyes. The gradient direction may be calculated as an angle $\theta$ with respect to a predetermined direction (for example, the direction from a pixel (x, y) to a pixel (x+dx, y+dy)). In addition, "Detection Method of Malignant Tumors in DR Images—Iris Filter—", Kazuo Matsumoto et al., Journal of the Electronic Information Communication Society, Vol. J75-D11, No. 3, pp. 663-670, 1992 discloses a method by which images are evaluated based on distributions of gradient vectors. Distributions of gradient vectors may also serve as characteristic amounts that represent likelihood of being red eyes.

A second method is based on the same principle as the first method. The second method classifies characteristic amounts in to two groups. One group includes characteristic amounts that require relatively small amounts of calculations, and the other group includes characteristic amounts that require large amounts of calculations. Judgment is performed in steps. That is, the judgment target region is scanned on the image twice.

Figure 10:
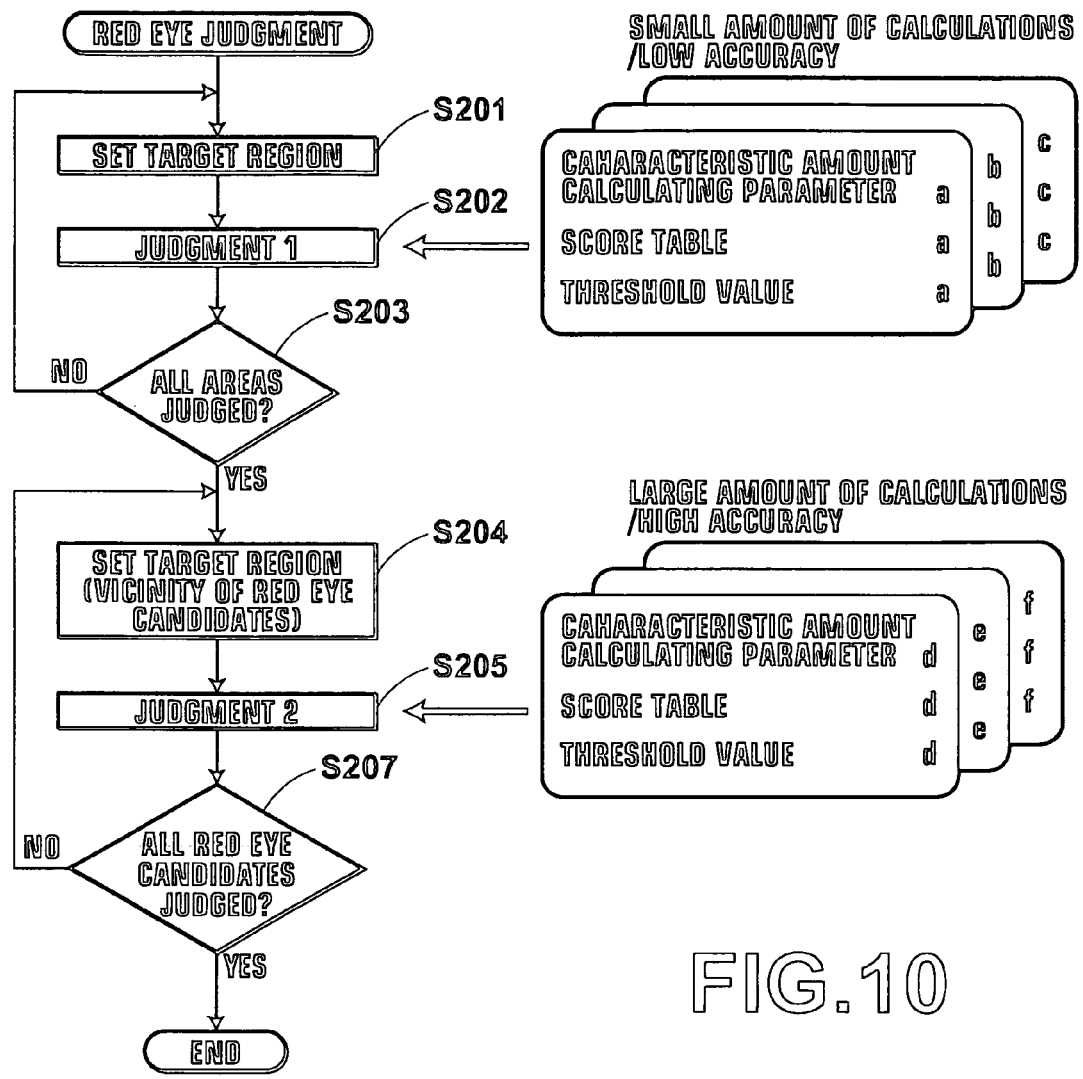
FIG. 10 is a flow chart for explaining a second method for improving processing efficiency during red eye candidate detecting processes.

FIG. 10 is a flowchart that illustrates the judgment process in the case that the second method is employed. As illustrated in the flow chart, during the first scanning, first, the judgment target region is set (step S201). Then, judgment is performed on the judgment target region employing only the characteristic amounts that require small amounts of calculations (step S202). The judgment target region is moved one pixel at a time and judgment is repeated, until the entirety of the image is scanned (step S203). During the second scanning, judgment target regions are set at the peripheries of the red eye candidates detected by the first scanning (step S204). Then, judgment is performed employing the characteristic amounts that require large amounts of calculations (step S205). Judgment is repeated until there are no more red eye candidates left to process (step S207).

In the second method, the judgment processes employing the characteristic amounts that require large amounts of calculations are executed on a limited number of judgment target regions. Therefore, the amount of calculations can be reduced as a whole, thereby improving processing efficiency. In addition, in the second method, the judgment results obtained by the first scanning may be output to a screen or the like prior to performing the second detailed judgment. That is, the amount of calculations in the first method and in the second method is substantially the same. However, it is preferable to employ the second method, from the viewpoint of users who observe reaction times of the red eye detecting apparatus.

Note that the number of groups that the characteristic amounts are classified in according to the amount of calculations thereof is not limited to two groups. The characteristic amounts may be classified into three or more groups, and the judgment accuracy may be improved in a stepwise manner (increasing the amount of calculations). In addition, the number of characteristic amounts belonging to a single group may be one type, or a plurality of types.

Figure 11:
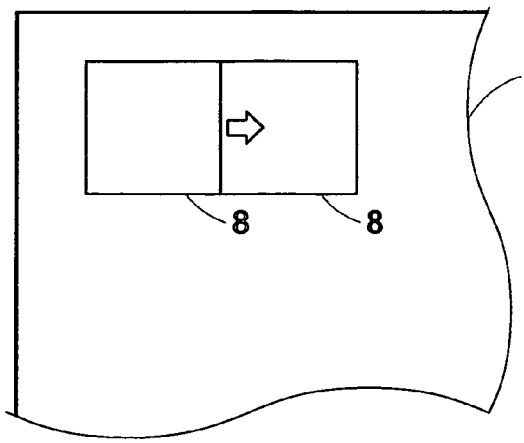
FIG. 11 is a diagram for explaining a third method for improving processing efficiency during red eye candidate detecting processes.

A third method is a method wherein the judgment target region is moved two or more pixels at a time during scanning thereof, as illustrated in FIG. 11, instead of one pixel at a time. FIG. 11 illustrates an example in which the judgment target region is moved in 10 pixel increments. If the total number of judgment target regions decreases, the amount of calculations as a whole is reduced, and therefore processing efficiency can be improved. Note that in the case that the third method is employed, it is preferable that learning is performed using a great number of sample images, in which the centers of red eyes are misaligned, such as that illustrated in FIG. 5C.

A fourth method is a method wherein judgment processes are performed on a lower resolution image first. Judgment target regions are relatively larger with respect to lower resolution images as compared to higher resolution images. Therefore, larger portions of the image can be processed at once. Accordingly, judgment is performed on a lower resolution image first, and regions in which red eyes are clearly not included are eliminated. Then, judgment is performed on a higher resolution image only at portions that were not eliminated by the first judgment.

Figure 12A:
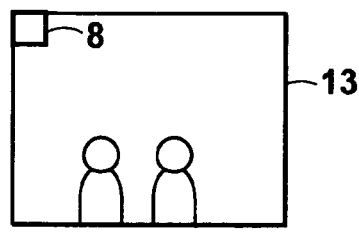
FIGS. 12A and 12B are diagrams for explaining a fourth method for improving processing efficiency during red eye candidate detecting processes.
Figure 12B:
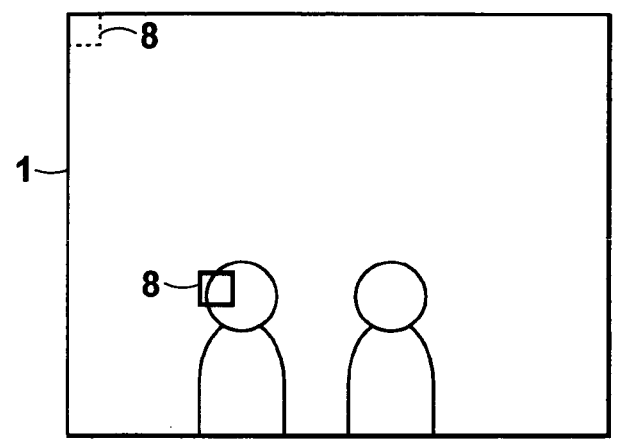

The fourth method is particularly effective for images in which people with red eyes are pictured at the lower halves thereof, and dark nightscapes are pictured at the upper halves thereof. FIG. 12A and FIG. 12B illustrate an example of such an image. FIG. 12A illustrates a low resolution image 13, and FIG. 12B illustrates a high resolution image 1, which was input to the red eye detecting apparatus.

As is clear from FIG. 12A and FIG. 12B, if the judgment target region 8 is scanned over the entirety of the low resolution image 13 first, the upper half of the image that does not include red eyes can be eliminated as red eye candidates by a process that involves small amounts of calculations. Therefore, the judgment target region 8 is scanned over the entirety of the low resolution image 13, and red eye candidates are detected. Then, a second candidate detection process is performed on the image 1, only in the peripheries of the detected red eye candidates. Thereby, the number of judgments can be greatly reduced. Note that in the case that this method is employed, it is preferable that learning is performed using a great number of sample images, in which the red eyes are small, such as that illustrated in FIG. 5B.

Figure 13:
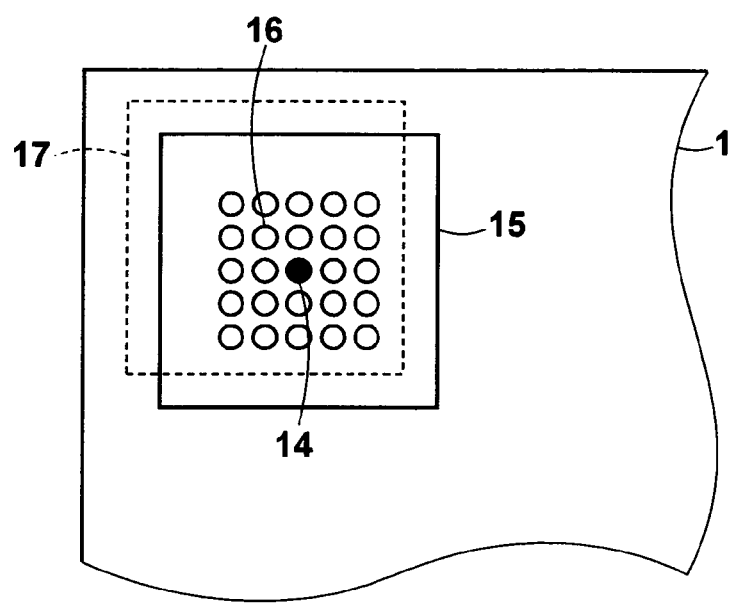
FIG. 13 is a diagram for explaining a fifth method for improving processing efficiency during red eye candidate detecting processes.

Next, a fifth method, which is effective if used in combination with the third or the fourth method, will be described with reference to FIG. 13. The third and fourth methods are capable of quickly narrowing down red eye candidates with small amounts of calculations. However, the detection accuracy of the positions of the detected red eye candidates is not high. Therefore, the fifth method searches for red eye candidates in the vicinities of the narrowed down red eye candidates. In the case that the fourth method is employed, the search for red eye candidates in the vicinities of the red eye candidates is performed on the higher resolution image.

For example, consider a case in which a red eye candidate having a pixel 14 at its center is detected by the third or fourth method. In this case, a judgment target region 15 is set so that the pixel 14 is at the center thereof. Then, judgment is performed employing the same characteristic amounts, score table, and threshold value as the previous judgment, or by employing characteristic amounts, score table, and threshold value having higher accuracy. Further, a highly accurate judgment is also performed within a judgment target region 17, having a pixel 16, which is adjacent to the pixel 14, at the center thereof.

In a similar manner, judgment target regions are set having the other 7 pixels adjacent to the pixel 14 at the centers thereof, and judgments regarding whether red eye exists therein are performed. Alternatively, judgment may be performed on the 16 pixels that are arranged so as to surround the 8 pixels adjacent to the pixel 14. As a further alternative, a plurality of judgment target regions that overlap at least a portion of the judgment target region 15 may be set, and judgment performed thereon.

In the case that a different red eye candidate is detected during the search of the peripheral region of the red eye candidate, the coordinates of the different red eye candidate (for example, the coordinates of the pixel 16) are added to the list. By searching the peripheral region of the red eye candidate in detail, the accurate position of the red eye candidate may be obtained.

Note that in this case, a single red eye is redundantly detected. Therefore, the aforementioned organization is performed after searching is complete. Specifically, coordinates of the judgment target region having the highest score total, from among the coordinates which have been judged to be red eyes and added to the list, is kept as a red eye candidate, and the other coordinates are deleted from the list.

Note that in the fifth method, the accuracy of judgment is improved over the previous judgment when searching for red eye candidates within the narrowed down regions. Thereby, the positional accuracy of the detected red eye candidates is improved. A sixth method, to be described below, is applicable to cases in which the judgment accuracy of the second and following judgments is desired to be improved over that of previous judgments.

In the sixth method, characteristic amounts are classified into two groups, in the same manner as in the second method. One group includes characteristic amounts that require relatively small amounts of calculations, and the other group includes characteristic amounts that require large amounts of calculations.

Figure 14:
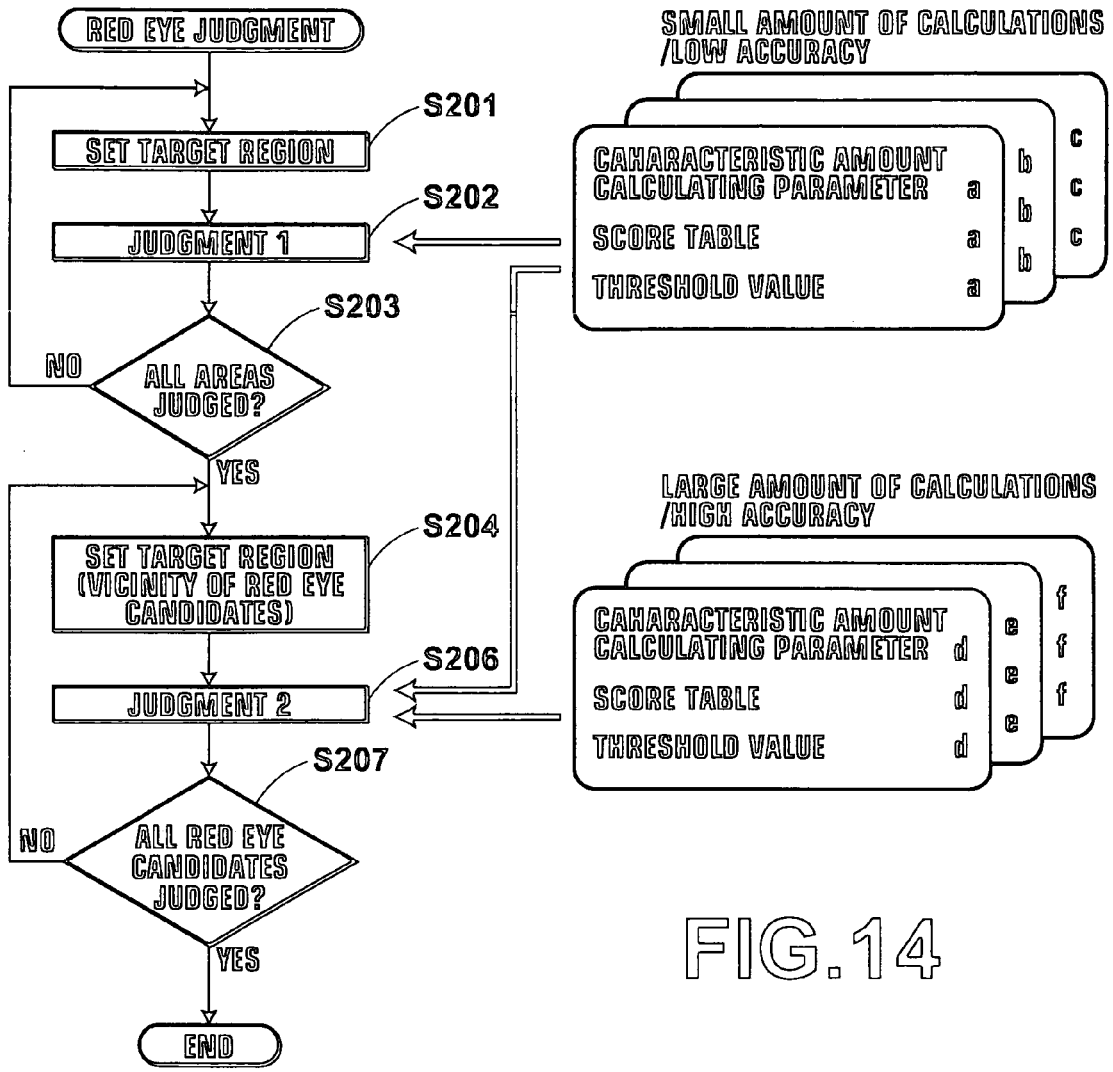
FIG. 14 is a flow chart for explaining a sixth method for improving processing efficiency during red eye candidate detecting processes.

FIG. 14 is a flowchart that illustrates the judgment process in the case that the sixth method is employed. As illustrated in the flow chart, during the first scanning, first, the judgment target region is set (step S201). Then, judgment is performed on the judgment target region employing only the characteristic amounts that require small amounts of calculations (step S202). The judgment target region is moved two pixels at a time as described in the third method, and judgment is repeated until the entirety of the image is scanned (step S203). Alternatively, the first scanning may be performed on a lower resolution image, as described in the fourth method.

During the second scanning, judgment target regions are set in the peripheries of the red eye candidates, which have been detected by the first scanning, as described in the fifth method (step S204). Then, judgments are performed (step S206) until there are no more red eye candidates left to process (step S207). Both characteristic amounts that require small amounts of calculations and those that require large amounts of calculations are employed during the judgments of step S206. However, during the judgment of step S206 employing the characteristic amounts that require small amounts of calculations, the threshold values are set higher than during the judgment of step S202. Specifically, the threshold value is set low during the judgment of step S202, to enable detection of red eyes which are located at positions off center within the judgment target regions. On the other hand, the judgment of step 206 sets the threshold value high, so that only red eyes, which are positioned at the centers of the judgment target regions, are detected. Thereby, the positional accuracy of the red eyes detected in step S206 is improved.

Note that the number of groups that the characteristic amounts are classified in according to the amount of calculations thereof is not limited to two groups. The characteristic amounts may be classified into three or more groups, and the judgment accuracy may be improved in a stepwise manner (increasing the amount of calculations). In addition, the number of characteristic amounts belonging to a single group may be one type, or a plurality of types.

The red eye detecting apparatus of the present embodiment employs the above methods either singly or in combination during detection of red eye candidates. Therefore, red eye candidates may be detected efficiently.

Note it would be clear to those skilled in the art that the methods for improving efficiency described above are not limited to cases in which detection is performed by the procedures of detecting red eye candidates, detecting faces, and confirming red eyes. The above methods may be applied to any other detecting process that involves calculations of characteristic amounts.

[Face Detecting Step]

Next, the face detecting step 3 will be described. There are various known face detecting methods, but each method has different detection properties. Here, "detection properties" refer to the kinds of detection each method is superior for. Examples of detection properties are: "fast detection"; "high detection rates"; "high detection accuracy"; "superior in detection of common faces (for example, forward facing faces without facial hair or glasses)" (hereinafter, referred to as "common face priority"); and "superior in detection of special faces (for example, faces in profile, faces with facial hair, and faces with glasses)" (hereinafter, referred to as "special face priority"). In the present specification, "high detection rates" refers to low incidences of misdetections (faces that are not detected as faces), and "high detection accuracy" refers to low incidences of false positive detections (objects being detected as faces, even though they are not faces).

Note that the detection properties do not depend solely on detection algorithms, and also depend on other conditions during execution of the detection algorithms. For example, even if the algorithm is the same in that a predetermined process is executed while scanning (shifting) a judgment target region on an image, the detection speed will differ according to the scanning density of the judgment target region. The same principle applies to the detection rate and the detection accuracy.

The face detecting step 3 may select a single face detecting method from among a plurality of face detecting methods, each having different detection properties, when executing the face detecting process. However, in the present embodiment, a plurality of different face detecting methods are employed in combination as required, in order to decrease misdetection of faces. This is because even if a face, which is undetectable by a certain face detecting method, is included in an image, the face can be positively detected by employing combinations of a plurality of face detection methods.

However, it is not preferable for processing time to increase, even if misdetections are decreased. It is necessary to suppress increases in processing time, while accurately and positively detecting faces. Therefore, the present embodiment applies the following rules when combining a plurality of face detecting methods having different detection properties.

Rule 1: Face detecting methods having high detection speeds are employed before face detecting methods having low detection speeds.
Rule 2: Face detecting methods having high detection accuracies are employed before face detecting methods having low detection accuracies.
Rule 3: Common face priority face detecting methods are employed before special face priority face detecting methods.
Rule 4: Face detecting methods are employed sequentially to detect faces, but if a face is detected by a certain face detecting method, subsequent detections by other face detecting methods are not performed.

In the present embodiment, the face detecting step 3 is performed by combining a first, a second, and a third face detecting method, to be described later, according to the above rules. The first and second face detecting methods have the same detection algorithm, but have different detection properties. The first face detecting method is superior in detection of forward facing faces, and the second face detecting method is superior in detection of faces in profile. The third face detecting method has an algorithm different from that of the first and second face detecting methods.

The face detecting algorithms of the first face detecting method and the second face detecting method are basically the same as the eye detecting algorithm of the red eye candidate detecting step 2. Specifically, the algorithms are similar in that: learning employing sample images is performed in advance, to select appropriate characteristic amounts, score tables and the like; optimal threshold values are set based on the learning; characteristic amounts are calculated for each pixel within judgment target regions, converted to scores, the scores are totaled and compared against the threshold values; searching is performed while varying the resolution of the image; and setting judgment target regions within the image during searches to investigate how many characteristics inherent to faces are present in the images within the judgment target regions.

However, the samples employed for learning, to select appropriate characteristic amounts, score tables and the like, are samples of faces, and not eyes. In the first face detecting method, learning is performed with emphasis placed on forward facing faces. For example, many images of front facing faces are included in the sample images employed for learning. Therefore, the first face detecting method is superior in detecting front facing faces. On the other hand, in the second face detecting method, learning is performed with emphasis placed on faces in profile. Therefore, the second face detecting method is superior in detecting faces in profile.

Figure 15:
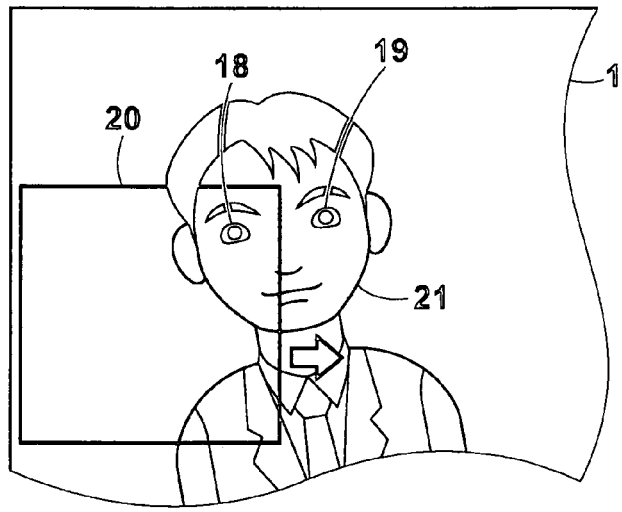
FIG. 15 is a diagram for explaining scanning of a judgment target region during face detecting processes.

The first and second face detecting methods do not search for faces within the entirety of the image. Instead, the first and second face detecting methods employ the red eye candidates, detected by the red eye candidate detecting step 2, as reference points. That is, faces are searched for only in the peripheries of the red eye candidates. FIG. 15 illustrates a state in which a judgment target region 20 is set on an image 1, in which red eye candidates 18 and 19 have been detected.

Figure 16:
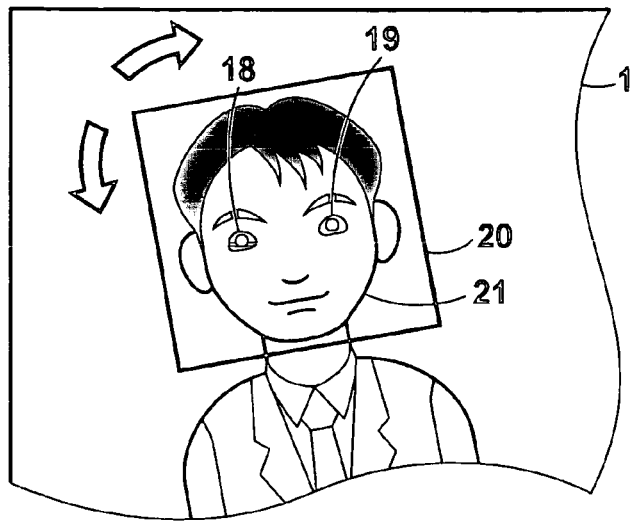
FIG. 16 is a diagram for explaining rotation of a judgment target region during face detecting processes.

In addition, in the first and second detecting methods, scanning of the judgment target region 20 is not limited to horizontal movement in the vicinities of the red eye candidates, as illustrated in FIG. 15. Searching is also performed while rotating the judgment target region 20, as illustrated in FIG. 16. This is because the values of characteristic amounts for faces vary greatly depending on the orientation of the face, unlike those for eyes (pupils). In the present embodiment, if faces are not detected with the judgment target region in a certain orientation, the judgment target region is rotated 30 degrees. Then, characteristic amounts are calculated, the characteristic amounts are converted to scores, and the totaled scores are compared against the threshold values, within the rotated judgment target region.

Figure 17:
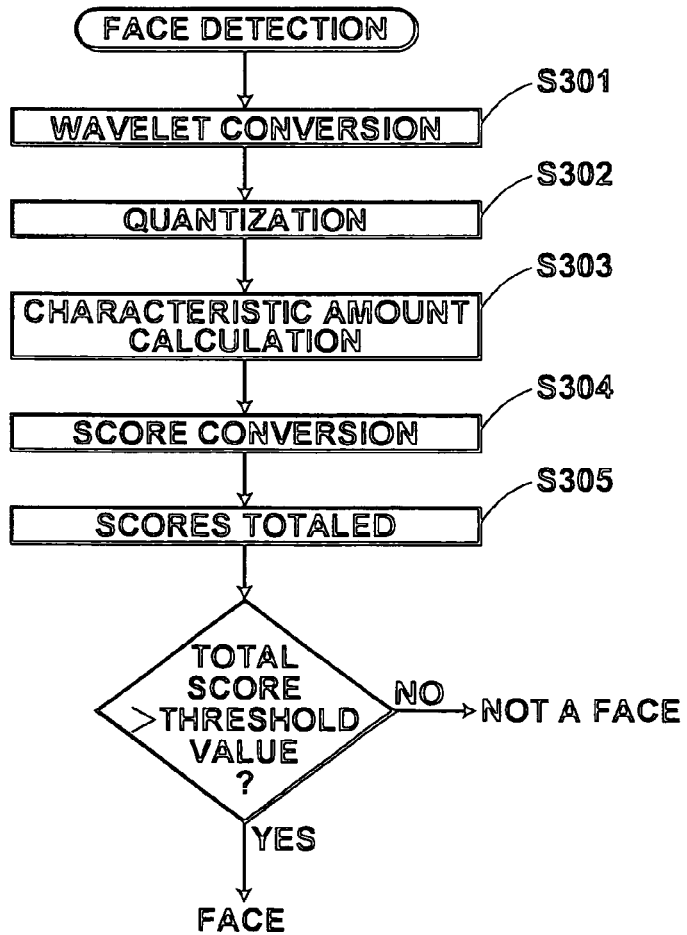
FIG. 17 is a flow chart that illustrates a face detecting process.

The first and second face detecting methods judge whether faces exist within the judgment target region based on characteristic amounts, which are extracted by wavelet conversion. FIG. 17 is a flow chart that illustrates the face detecting process.

The red eye detecting apparatus first administers wavelet conversion on Y (luminance) components of the image within the judgment target region (step S301). Thereby, a ¼ size sub band image, an LL0 image, an LH0 image, an HL0 image, and an HH0 image (hereinafter, these will be collectively be referred to as "level 0 images") are generated. In addition, a 1/16 size sub band image, an LL1 image, an LH1 image, an HL1 image, and an HH1 image (hereinafter, these will be collectively be referred to as "level 1 images") are generated. Further, a 1/64 size sub band image, an LL2 image, an LH2 image, an HL2 image, and an HH2 image (hereinafter, these will be collectively be referred to as "level 2 images") are generated.

Thereafter, the red eye detecting apparatus employs local scattering to normalize and quantize the sub band images, which have been obtained by wavelet conversion (step S302).

Figure 18:
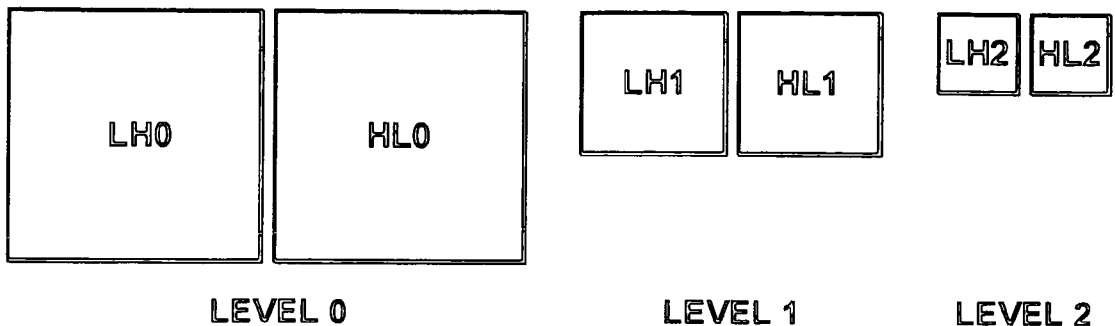
FIG. 18 is a diagram for explaining calculation of characteristic amounts during face detecting processes.

In the case that images are analyzed by wavelet conversion, LH images are obtained, in which the edges in the horizontal direction are emphasized. Further, HL images are obtained, in which the edges in the vertical direction are emphasized. For this reason, characteristic amounts are calculated from within level 0, level 1, and level 2 LH and HL images (step S303) during a face judging process, as illustrated in FIG. 18. In the present embodiment, arbitrary four point combinations of the wavelet coefficients of the LH images and the HL images are defined as characteristic amounts that represent likelihood of being faces. Next, the calculated characteristic amounts are converted to scores (step S304), the scores are totaled (step S305), and the total scores are compared against threshold values (step S306), in a manner similar to that of the red eye candidate detecting step 2. The red eye detecting apparatus judges the image within the judgment target region to be a face if the total score is greater than or equal to the threshold value, and judges that the image is not of a face if the total score is less than the threshold value. Note that the above processes utilize the fact that edges exist at portions that correspond to the outlines of faces, within images that represent faces, and at the boundaries between eyes and skin. Therefore, edges, which are included at predetermined portions of images, are defined as characteristic amounts that represent likelihood of being faces, to perform judgment and detection. That is, face detection is performed based only on data related to structures. An example of a method other than that which employs wavelet coefficients is that in which differences between the pixel values of pixels (x, y) and pixels (x+dx1, y+dy1) are defined as characteristic amounts.

Alternatively, processes that utilize edge data and color data in combination may be considered. That is, the characteristic amounts that represent likelihood of being faces are not necessarily limited to those that are calculated based on the Y components of images. The characteristic amounts may be those which are calculated based on the Y components, the Cb components, and the Cr components. In the case that judgment is performed based only on characteristic amounts related to structures, such as edges, the possibility that structures similar to faces will be detected as false positives cannot be completely eliminated. However, false positive detections can be prevented, by utilizing the color data in combination with the edge data.

The third face detecting method detects skin colored regions in the vicinities of the red eye candidates, and judges the skin colored regions as faces. Because this method employs only color data to judge faces, the detection accuracy is low compared to the first and second face detecting methods. However, the detection rate of the third face detecting method is high. In the case that a face is detected by the third face detecting method, the face is correlated with red eye candidates and registered in the face list.

In the face detecting step 3, first, a first face detecting process is performed employing the first face detecting method (first subject detecting process). If a face is detected, then the process ends. If a face is not detected, then a second face detecting process is performed employing the second face detecting method (second subject detecting process). If a face is detected by the second face detecting process, the process ends. If a face is not detected by the second face detecting process, a third face detecting process is performed employing the third face detecting method. If a face is detected by the third face detecting process, the process ends. If a face is not detected by the third face detecting process, detection results indicating that a face was not detected is output, and the face detecting step 3 ends.

In the case that a face is detected by the aforementioned search, the red eye detecting apparatus registers the face in a face list, correlated with the red eye candidate that served as the reference point for the search. In the example illustrated in FIG. 15 and FIG. 16, the red eye 18 and a face 21 are correlated and registered in the face list. In addition, the red eye 19 and the face 21 are correlated and registered in the face list.

In the case that the same face is redundantly detected, the registered information is organized. In the aforementioned example, information regarding the face 21, the red eye candidates 18 and 19 are consolidated into one piece of information. The consolidated information is reregistered in the face list. The face list is referred to in the red eye confirming step 4, to be described below.

[Methods for Improving Face Detection Efficiency]

It would be clear to those skilled in the art that the methods to improve the efficiency of red eye candidate detection described previously can be applied to the first or second face detecting methods, to improve the efficiency of the face detecting step.

For example, the amount of calculations required differs between the characteristic amounts, which are defined by the differences between pixel values of pixels (x, y) and pixels (x+dx1, y+dy1), and those which are defined by the gradient directions of edges at pixels (x, y). Accordingly, in the case that a plurality of types of characteristic amounts are defined as those that represent likelihood of being faces, the characteristic amounts may be grouped according to the amount of calculations required therefor. The amount of calculations can be reduced, without deteriorating the detection accuracy, by performing judgments in order, by employing characteristic amounts that require less amounts of calculation first.

In addition, by shifting the judgment target regions by greater increments of pixels during scanning, the processing time can be reduced. Further, lower resolution images may be employed to perform judgments, based on characteristic amounts that require less amounts of calculations, to eliminate regions that do not include faces first. Thereafter, higher resolution images may be employed to perform judgments, based on characteristic amounts that require greater amounts of calculations. Thereby, the amount of calculations and the processing time can be reduced. Still further, after faces are detected in a judgment target region, a plurality of judgment target regions may be set such that at least a portion thereof overlaps with the judgment target region, and similar judgments may be performed with respect to the plurality of judgment target regions. Alternatively, judgments may be performed using the same characteristic amounts, but with a higher threshold value. Thereby, the positional accuracy in detection can be improved.

Note that each of the above methods for improving efficiency may be employed either singly or in combination, in the same manner as in the red eye candidate detecting process.

[Red Eye Confirming Step]

Next, the red eye confirming step 4 will be described. The red eye confirming step 4 judges whether the red eye candidates, which have been correlated with faces and recorded in the face detecting step 3, are true red eyes. In other words, the red eye confirming step 4 verifies the detection results of the red eye candidate detecting step 2. The judgment of red eye in the red eye confirming step 4 is the final judgment that affects the detection results of the red eye detecting apparatus. Therefore, it is necessary that the judgment of red eye to be performed more accurately than that performed in the red eye candidate detecting step 2. Hereinafter, the red eye judgment process performed by the red eye confirming step 4 will be described.

Figure 19:
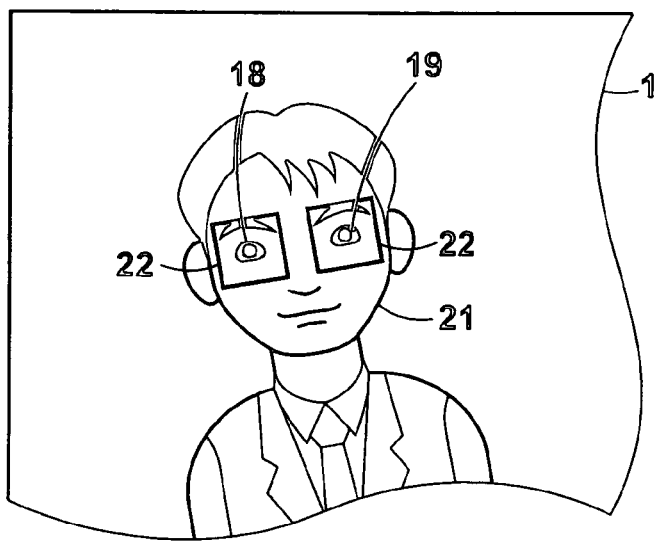
FIG. 19 is a diagram for explaining the manner in which search regions are set during red eye confirming processes.

FIG. 19 illustrates the red eye candidates 18 and 19, which have been detected from the image 1 by the red eye candidate detecting step 2, the face 21, which has been detected by the face detecting step 3, and search regions 22, which have been set in the image 1 by in the red eye confirming step 4. The objective of the red eye candidate detecting step 2 is to detect red eye candidates. Therefore, the search region for the red eye candidate detecting step 2 was the entirety of the image. In contrast, the objective of the red eye confirming step 4 is to verify the detection results of the red eye candidate detecting step 2. Therefore, the search region may be limited to the vicinities of the red eye candidates, as illustrated in FIG. 19.

During the red eye confirming step 4, the red eye detecting apparatus refers to information regarding the size and orientation of faces, obtained in the face detecting step 3. Thereby, the orientations of the red eye candidates are estimated, and the search regions are set according to the sizes and orientations of the red eye candidates. That is, the search regions are set so that the vertical directions of the pupils match the vertical directions of the search regions. In the example illustrated in FIG. 19, the search regions 22 are inclined to match the inclination of the face 21.

Figure 20:
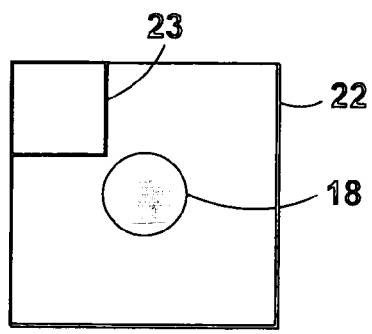
FIG. 20 illustrates an example of a judgment target region, which is set within the search region of FIG. 19.

Next, the red eye judgment process performed within the search regions 22 will be described. FIG. 20 illustrates the search region 22 in the vicinity of the red eye candidate 18. In the red eye judgment process, a judgment target regions 23 are set within the search region 22.

Next, characteristic amounts are calculated for each pixel within the judgment target region 23, and the calculated characteristic amounts are converted to scores that represent likelihood of being red eyes by employing a score table, in the same manner as in the red eye candidate detecting step. Then, the red eye candidates are judged to be red eyes if the total value of the scores corresponding to each pixel within the judgment target region exceeds a threshold value. The red eye candidates are judged not to be red eyes if the total value of the scores is less than the threshold value.

The judgment target region 23 is scanned within the search region 22, and the judgment described above is performed repeatedly. In the case of the red eye confirming step 4, red eye candidates are present within the search region 22, as opposed to the red eye candidate detecting step 2. Accordingly, in the case that judgments are performed by scanning the judgment target region 23 within the search region 22, many judgment results indicating red eye should be obtained. There are cases in which the number of positive judgments indicating red eye is small, regardless of the fact that the judgments were performed by scanning the judgment target region 23 within the search region 22. In these cases, there is a possibility that the red eye candidate 18 is not a true red eye. This means that the number of times that red eye is judged to exist, during scanning of the judgment target region 23, is an effective index that represents the reliability of the detection results of the red eye candidate detecting step 2.

Figure 21A:
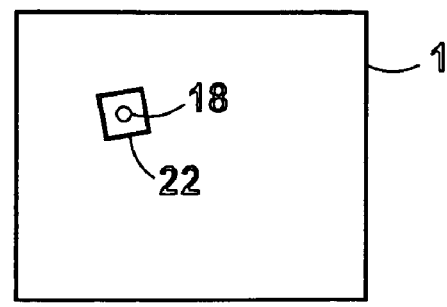
FIGS. 21A, 21B, and 21C illustrate examples of search regions, which are set on images of differing resolutions.
Figure 21B:
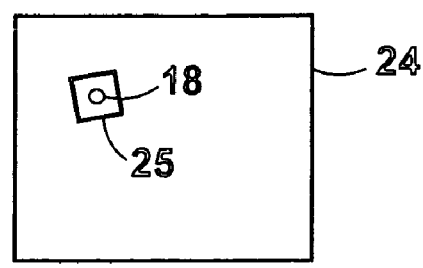
Figure 21C:
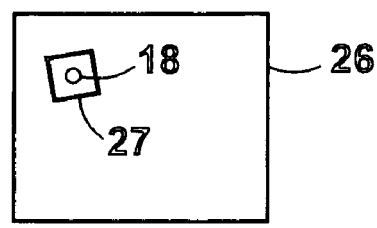

A plurality of images having different resolutions are employed during judgment of red eye in the red eye confirming step 4, in the same manner as in the red eye candidate detecting step 2. FIGS. 21A, 21B, and 21C illustrate states in which search regions 22, 25, and 27, all of the same size, are respectively set in the vicinity of the red eye candidate 18, within images 1, 24, and 26, which are of different resolutions.

The resolutions of images are finely varied in the red eye confirming step 4, unlike in the red eye candidate detecting step 2. Specifically, the resolution is changed so that the image 24 of FIG. 21B has about 98% of the number of pixels of the image 1 of FIG. 21A, and so that the image 26 of FIG. 21C has about 96% of the number of pixels of the image 1 of FIG. 21A.

In the red eye confirming step 4 of the present embodiment, the number of times that red eye was judged to exist in the images having different resolutions are totaled. If this total number is greater than a predetermined number, it is judged that the red eye candidate is a true red eye. On the other hand, if the total number is the predetermined number or less, it is judged that the red eye candidate was a false positive detection, and that it is not a true red eye. In this case, the red eye detecting apparatus deletes information regarding the red eye candidate from every list that it is registered in. Alternatively, the total values of the scores may be utilized to judge whether the red eye candidates are true red eyes, instead of the total number of judgments. As a further alternative, both the total number of judgments and the total values of the scores may be utilized to judge whether the red eye candidates are true red eyes.

In the case that red eye candidates are judged to be true red eyes, the red eye confirming step 4 then confirms the positions of the red eyes. As described above, if judgments are performed by scanning the judgment target region within the search regions, positive judgments are obtained at many judgment target regions. Therefore, the red eye detecting apparatus of the present invention defines a weighted average of the center coordinates of the judgment target regions, in which positive judgments were obtained, as the value that represents the position of the red eye. The weighting is performed corresponding to the total score, which was obtained during judgment, of the judgment target regions.

Figure 22:
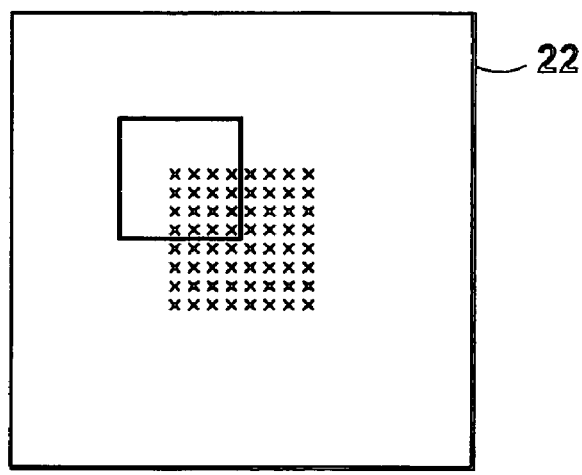
FIG. 22 is a diagram for explaining a process fro confirming the positions of red eyes.

FIG. 22 is a diagram for explaining the method by which the positional coordinates of red eyes are confirmed. FIG. 22 illustrates the search region 22 and the center coordinates (indicated by x's) of the judgment target regions in which positive judgments were obtained. In the example of FIG. 22, positive judgments were obtained for M (M is an arbitrary integer, in this case, 48) judgment target regions. In this case, the position (x, y) of the red eye is represented by the following formulas:

$$x = \left( \sum_{i=0}^{i<M} Si x i \right) / M$$

$$y = \left( \sum_{i=0}^{i<M} Si y i \right) / M$$

wherein (xi, yi) are the center coordinates of an i-th judgment target region ($0 \leq i < M$), and Si is the total score obtained by the red eye judgment processes in the i-th judgment target region.

Figure 23:
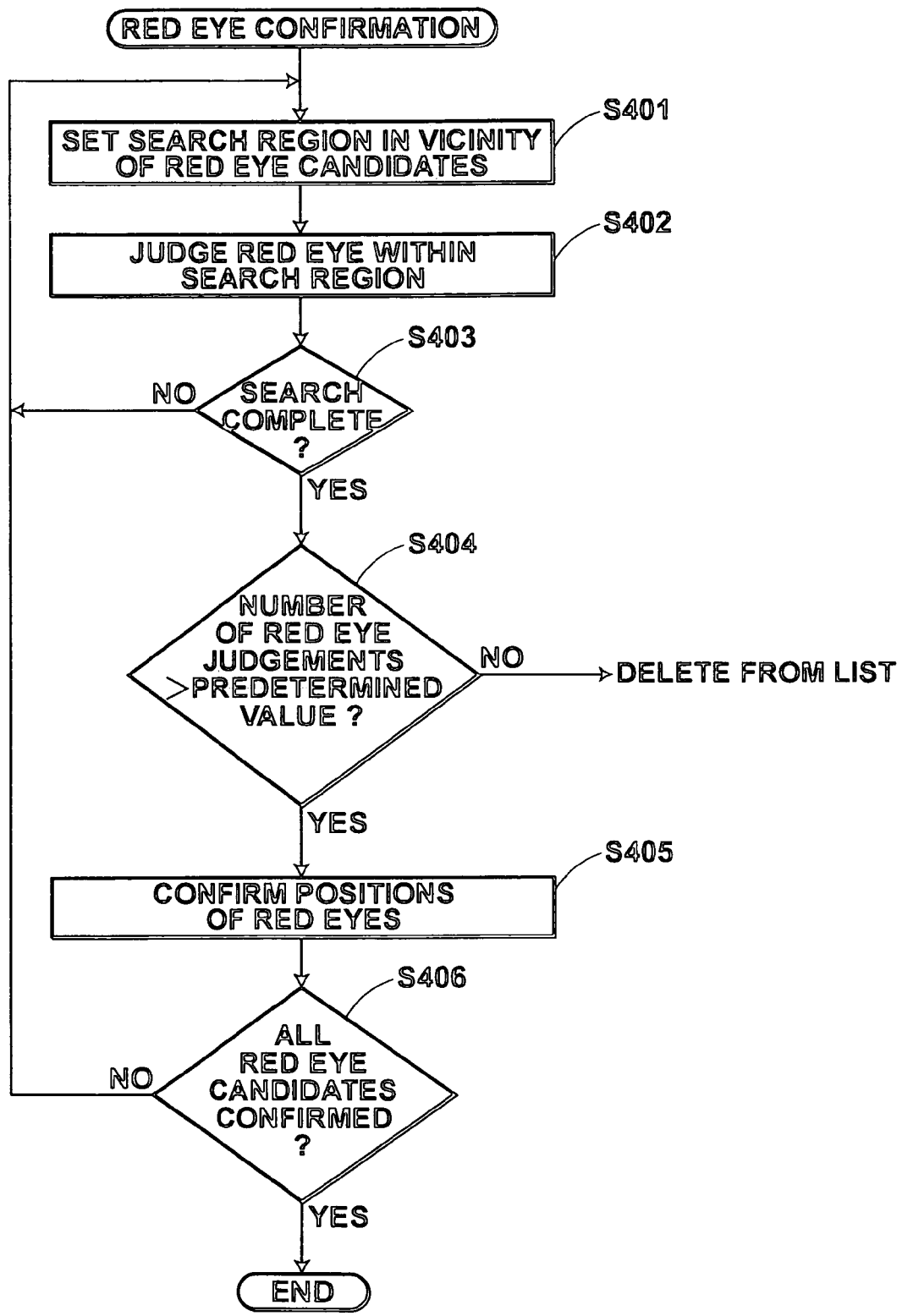
FIG. 23 is a flow chart that illustrates a red eye confirming process.

FIG. 23 is a flow chart that illustrates processes of the red eye confirming step. As illustrated in the flow chart, the first process in the red eye confirming step is the setting of search regions in the vicinities of red eye candidates (step S401). Next, red eye judgment, as has been described with reference to FIGS. 19 through 21, is performed within the search ranges (step S402). When the searching within the search region is completed (step S403), the number of positive judgments is compared against the predetermined number (step S404). In the case that the number of positive judgments is less than or equal to the predetermined number, the red eye candidate is deleted from the list. In the case that the number of positive judgments is greater than the predetermined number, the position of the red eye is confirmed (step S405) by the process described with reference to FIG. 22. The red eye confirming step 4 is completed when the above processes are completed for all of the red eye candidates detected in the red eye candidate detecting step 2.

Note that the characteristic amounts, the score tables, and the threshold values, which are employed in the red eye confirming step 4 may be the same as those which are employed in the red eye candidate detecting step 2. Alternatively, different characteristic amounts, score tables, and threshold values may be prepared for the red eye confirming step 4.

In the case that different characteristic amounts, score tables, and threshold values are defined for the red eye confirming step 4, only images that represent standard red eyes are employed as sample images during learning. That is, learning is performed using only sample images of red eyes having similar sizes and orientations. Thereby, detection is limited to true red eyes, and the accuracy of judgment is improved.

In the red eye candidate detecting step 2, it is preferable that the variation among sample images, which are employed during learning, is not decreased, because a decrease in variation would lead to red eye candidates not being detected. However, the red eye confirming step 4 is a process that verifies the detection results of the red eye candidate detecting step 2, and employs search regions in the vicinities of the detected red eye candidates. Therefore, the variation among sample images, which are employed during learning, may be comparatively small. In the red eye confirming step 4, the smaller the variation in sample images, which are employed during learning, the stricter the judgment standards become. Therefore, the accuracy of judgment is improved over that of the red eye candidate detecting step 2.

Note that it would be clear to those skilled in the art that the methods to improve the efficiency of red eye candidate detection described previously can be applied to the red eye confirming step 4. In addition, the reliability of the detection results is not represented only by the total scores or the number of judgments, in the red eye confirming step described above. The reliability of the detection results is also represented in the size and positional relationships between the eyes and faces, when the red eye candidates and the faces are correlated with each other. Therefore, data regarding the size and positional relationships may also be utilized to render final judgment regarding whether red eye candidates are true red eyes. By verifying the detection results of the red eye candidate detecting step 2 in the red eye confirming step 4, the detection accuracy can be improved, and also the accurate positional coordinates of the detected red eyes can also be obtained. In the present embodiment, judgment is repeated while moving the judgment target region in fine increments in the vicinities of the red eye candidates. In addition, judgment is repeated while the resolution of the image is finely varied. Then, the positions of the red eyes are confirmed by obtaining weighted averages, based on the scores. Therefore, even if judgment is erroneous in a given region, the effect that this result will exert on the final output is small.

The method of the present embodiment requires the three steps of: red eye candidate detection; face detection; and red eye confirmation. Therefore, it may appear that the number of processes is increased compared to conventional methods. However, the amount of calculations involved in the red eye confirming step 4 is far less than that involved in characteristic extraction processes administered on faces. In addition, because the search regions are limited to the vicinities of red eye candidates, neither the amount of processing nor the complexity of the apparatus are greatly increased compared to conventional methods and apparatuses.

Note that according to the present embodiment, first, candidates are detected by performing judgment under loose conditions. Then, the detection results are verified by performing judgment with stricter conditions in the vicinities of the candidates. This method is not limited to detecting red eye, but is applicable to detection of any subject. Verification of detection results according to the number of positive judgments of the subject, and confirming the position of the subject based on weighted averages of the redundantly detected subjects are extremely effective methods for improving the detection accuracy, regardless of the subject to be detected.

[Redetection Process]

As described previously, in the case that the number of red eyes confirmed by the red eye confirming step 4 is one or less (none, or only one) even if the face detected by the face detecting step 3 is a front facing face, a second red eye candidate detecting step, which has a higher degree of accuracy than the red eye candidate detecting step 2 is performed. Then, the face detecting step 3 and the red eye confirming step 4 are performed with respect to the red eye candidates which have been detected by the second red eye candidate detecting step. In addition, similar processes are performed in the case that the face detected in the vicinity of the red eye candidate is a face in profile, and number of red eye candidates confirmed to be red eye by the red eye confirming step 4 is 0. Hereinafter, redetection of red eye candidates (second structural element candidate detecting process) will be described.

There are various factors that may be considered as reasons why red eyes are not detected as red eye candidates by the red eye candidate detecting step 2. For example, the scanning density may have been reduced in order to prioritize processing speed. That is, detection may have been performed while moving the judgment target region 8 on the image 1 illustrated in FIG. 3 in great increments (number of pixels). Alternatively, detection of red eye candidates may have been performed using a judgment target region 8 of a size (10 pixels× 10 pixels, for example) appropriate for an estimated size of red eyes, yet the actual size of red eye was smaller than the estimated size. Thus, in the redetection process, the entire image is set as the search range, and a detection process, having a higher detection rate than the previously executed red eye candidate detecting process, is performed.

As red eye detecting methods having higher detection rates than the previously executed red eye candidate detecting step, the following may be considered.

First, in the case that the judgment target region was scanned with low scanning density in the previous red eye candidate detecting step, the scanning density of the redetection process may be increased. At this time, scanning may be performed only on pixels that were scanned over in the previous red eye candidate detecting step.

In addition, unlike the case in which the red eye candidate detecting step is performed for the first time with respect to an image, facial regions are already detected by the face detecting step 3 in the redetection process. Accordingly, the image within the facial regions may be enlarged, and redetection performed with the enlarged facial region image as the target.

Further, a pre-process may be administered to the facial region image detected by the face detecting step 3, in order to facilitate detection of red eye candidates, prior to redetection.

Figure 25:
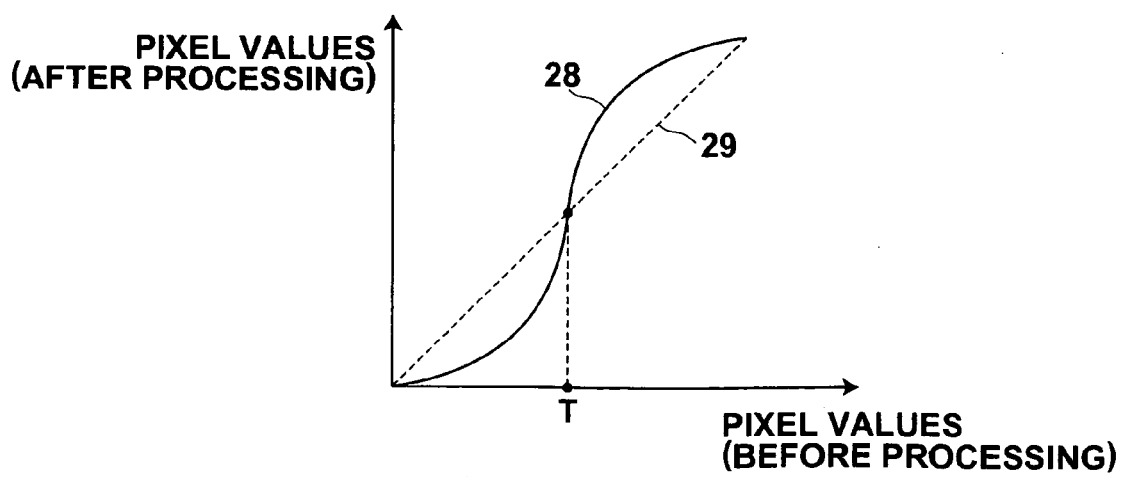
FIG. 25 is a graph for explaining a pre-process that facilitates detection of red regions.

As a pre-process for facilitating detection of red eye candidates, a process for emphasizing redness in parts of the facial region at where redness is comparatively conspicuous may be considered. For example, a conversion table, in which the relationships between pixel values are graphed as an S-shaped curve, when pixel values prior to the process are plotted along a horizontal axis, and pixel values following the process are plotted along a vertical axis, is prepared. FIG. 25 is a diagram that illustrates an example of such a conversion table. The relationships between the pixel values prior to and following the process are indicated by solid line 28. Note that in FIG. 25, broken line 29 indicates a relationship of "Input Values=Output Values".

The conversion table is employed to convert the R, G, and B values of each of the pixels that constitute the facial region. In this case, if the pixel value at the point where the solid line 28 and the broken line 29 intersect is designated as T, if the R value of a pixel is greater than T, then the R value is converted to an even greater value. As a result, redness is emphasized more at regions at which redness is comparative conspicuous (regions where R>T).

As another pre-process to facilitate detection of red eye candidates, a process for enlarging red regions within facial regions may be considered. To enlarge the red regions, a maximum value filter maybe applied to an R channel, while minimum value filters are applied to a G channel and a B channel of the image of a facial region, for example. Here, the maximum value filter is a filter that converts the pixel values of each pixel within the filter to the maximum value from among the pixel values. The minimum value filters are filters that convert the pixel values of each pixel within the filters to the minimum value from among the pixel values. By processing images with these types of filters, regions that include any redness are converted to a sharp red color. As a result, the red regions are enlarged.

The redetection process employs one or a combination of the above methods, to detect red eye candidates. The processes administered on the redetected red eye candidates by the red eye confirming step 4 are the same as those administered on red eye candidates which were detected in the first red eye candidate detecting step. Therefore, detailed descriptions of the processes will be omitted.

It would be clear to those skilled in the art that the methods to improve the efficiency of red eye candidate detection described previously can be applied to redetection process to improve the efficiency of the face detecting step, to a degree that does not reduce the detection accuracy thereof, compared to the detection accuracy of the red eye candidate detecting step.

In this manner, the redetection process is performed only in cases that a previous red eye confirming step confirms one or less red eyes. Therefore, the processing time as a whole is reduced compared to a case in which a red eye candidate detecting method having a high detection rate is employed first. In addition, red eyes can be positively confirmed, if they exist.

<Utilization of the Detection Results>

Figure 24:
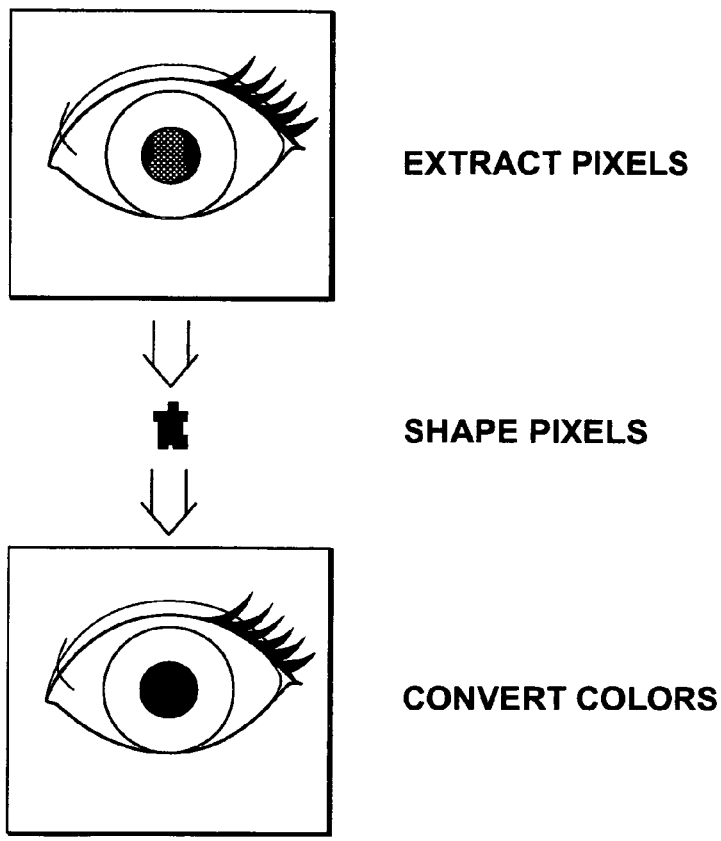
FIG. 24 illustrates an example of a red eye correcting process.

The red eye detection results are utilized to correct red eye, for example. FIG. 24 illustrates an example of a red eye correcting process. In the exemplary process, first, pixels, of which the color difference value Cr exceeds a predetermined value, are extracted. Then, a morphology process is administered to shape the extracted region. Finally, the colors of each pixel that constitute the shaped region are replaced with colors which are appropriate for pupils (such as a gray of a predetermined brightness).

Note that other known methods for correcting red eyes within images may be applied as well.

An alternative embodiment may be considered in which red eye is not corrected, but a warning is issued indicating that a red eye phenomenon has occurred. For example, a red eye detecting function may be incorporated into a digital camera. The red eye detecting process maybe executed on an image immediately following photography thereof, and an alarm that suggests that photography be performed again may be output from a speaker in the case that red eyes are detected.

Note that in cases in which output of an alarm is sufficient, accurate positional coordinates of red eyes are not necessary. Therefore, the process of confirming the positions of red eyes may be omitted from the red eye confirming step 4.

OTHER EMBODIMENTS

An embodiment of the present invention, as well as modifications and combinations thereof, has been described above. However, the technical range of the present invention is not limited to the embodiment described above. Various modifications and combinations thereof are possible.

For example, pre-processing of facial region images, to facilitate red eye detection, has been proposed for the redetection process. However, this type of pre-process may be administered on the entire image prior to the red eye candidate detecting step 2.

In addition, skin colored regions may be detected from within images prior to the red eye candidate detecting step. In this case, the red eye candidate detecting step can be executed with respect to only the detected skin colored regions.

Further, the present invention is applicable to cases other than those in which eyes are photographed as red eyes. For example, there are cases in which human eyes are photographed as gold, depending on the manner in which light is reflected thereby. In addition, nocturnal animals have layers that reflect light (tapetums) behind their retinas. In the case that light is reflected by tapetums, it is often the case that eyes are photographed as yellow-green. The present invention can also be applied to detect eyes of these different colors. Note that normally colored eyes (black, in the case of Asians) can also be detected, in addition to abnormally colored eyes. In addition, the present invention is not limited to detecting eyes, and may be applied to detect noses, mouths, ears, and other structural elements that constitute faces.

Still further, the detection targets of the present invention are not limited to structural elements that constitute faces. For example, learning may be performed employing sample images of vehicles and license plates, and appropriate characteristic amounts and threshold values may be selected. In this case, the present invention may be utilized to detect license plates from images, in which vehicles are pictured. It would be easily understood by those skilled in the art that the present invention can be applied to detect structural elements of various other subjects as well.

What is claimed is:

1. A structural element detecting apparatus for detecting predetermined structural elements included in predetermined subjects from within images that include the subjects, comprising:

a structural element candidate detecting section, for detecting structural element candidates by discriminating characteristics inherent to the predetermined structural elements, from among characteristics of the images;

a subject detecting section, for detecting subjects that include the structural element candidates by discriminating characteristics inherent to the predetermined subjects, from among characteristics of the images in the vicinities of the structural element candidates; and a structural element confirming section, for confirming that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within subjects detected by the subject detecting section;

wherein the structural element confirming section performs discrimination, utilizing data regarding subjects detected by the subject detecting section;

wherein the structural element confirming section compares the number of structural element candidates, detected by a first structural element candidate detecting process and confirmed as being the predetermined structural elements, against the maximum number of structural elements which are possibly included within the subjects detected by the subject detecting section; and a second structural element candidate detecting process, having a higher detection rate than the first structural element candidate detecting process, is executed in the case that number of structural element candidates, which have been detected by the first structural element candidate detecting process and confirmed to be structural elements by the structural element confirming section, is less than the maximum number.

2. A structural element detecting apparatus as defined in claim 1, wherein:

the subject detecting section is capable of executing a plurality of subject detecting processes, which have different detection properties; and a second subject detecting process, having different detection properties from that of a first subject detecting process, is executed in the case that the first subject detecting process does not detect a subject.

3. A structural element detecting apparatus as defined in claim 1, wherein:

the structural element confirming section confirms as the predetermined structural elements those structural element candidates which have characteristics inherent to structural elements of the same orientations as the orientations of subjects detected by the subject detecting section.

4. A structural element detecting apparatus as defined in claim 1, wherein:

the structural element confirming section confirms as the predetermined structural elements those structural element candidates which have characteristics inherent to structural elements of sizes estimated from the sizes of subjects detected by the subject detecting section.

5. A structural element detecting apparatus as defined in claim 1, wherein:

the structural element confirming section confirms the positions of structural elements, based on data obtained during the process of discriminating characteristics inherent to the predetermined structural elements, from among the characteristics of the images in the vicinity of the structural element candidates included in the subjects detected by the subject detecting section.

6. A structural element detecting apparatus as defined in claim 1, wherein the structural element candidate detecting section comprises:

target region setting means, for setting judgment target regions within an image; and judging means, for judging whether images within the judgment target regions set by the target region setting means represent structural elements, based on a plurality of characteristic amounts, which are calculated from pixel values of pixels that constitute the images within the judgment target regions;

the judging means executing the processes of:

classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;

outputting judgment results indicating that an image within a judgment target region does not represent structural elements, in the case that it is judged that the image within the judgment target region does not represent structural elements, based on characteristic amounts obtained by formulas in a Kth group;

performing judgment, based on characteristic amounts obtained by formulas in a (K+1)th group, in the case that it is judged that an image within a judgment target region represents structural elements, based on characteristic amounts obtained by formulas in a Kth group; and outputting judgment results indicating that the image within the judgment target region represents structural elements, in the case that it is judged that the image within the judgment target region represents structural elements, based on characteristic amounts obtained by formulas in the Nth group.

7. A structural element detecting apparatus as defined in claim 6, wherein:

the judging means performs first judgment, based on the characteristic amounts obtained by formulas in a Kth group, with respect to a plurality of judgment target regions set by the target region setting means; and the judging means performs second judgment, based on the characteristic amounts obtained by formulas in a (K+1)th group, with respect to judgment target regions, which have been judged to represent structural elements by the first judgment.

8. A structural element detecting apparatus as defined in claim 6, wherein:

the judgment target regions are set such that the positions of judgment target regions closest to each other are shifted at least two pixels, during at least a portion of the judgments performed by the judging means.

9. A structural element detecting apparatus as defined in claim 8, wherein:

the judging means performs first judgment, based on the characteristic amounts obtained by formulas in a Kth group, with respect to the plurality of judgment target regions set by the target region setting means; and the judging means performs second judgment, based on the characteristic amounts obtained by formulas in a (K+1)th group, with respect to a plurality of judgment target regions, which are set such that at least a portion thereof overlaps with judgment target regions that have been judged to represent structural elements by the first judgment.

10. A structural element detecting apparatus as defined in claim 9, wherein:

at least one of the formulas for calculating characteristic amounts classified in a Kth group is also included in a (K+1)th group.

11. A structural element detecting apparatus as defined in claim 6, wherein:

the judging means performs first judgment, based on characteristic amounts obtained by formulas in a Kth group, with respect to judgment target regions, which are set within an image represented at a predetermined resolution; and the judging means performs second judgment, based on characteristic amounts obtained by formulas in a (K+1)th group, with respect to the judgment target regions, which are set within the image represented at a higher resolution than that of the first judgment.

12. A structural element detecting apparatus as defined in claim 11, wherein:

the judging means performs first judgment, based on the characteristic amounts obtained by formulas in a Kth group, with respect to the plurality of judgment target regions set by the target region setting means; and the judging means performs second judgment, based on the characteristic amounts obtained by formulas in a (K+1)th group, with respect to a plurality of judgment target regions, which are set such that at least a portion thereof overlaps with judgment target regions that have been judged to represent structural elements by the first judgment.

13. A structural element detecting apparatus as defined in claim 12, wherein:

at least one of the formulas for calculating characteristic amounts classified in a Kth group is also included in a (K+1)th group.

14. A structural element detecting apparatus as defined in claim 1, wherein the subject detecting section comprises:

target region setting means, for setting judgment target regions within an image; and judging means, for judging whether images within the judgment target regions set by the target region setting means represent the predetermined subjects, based on a plurality of characteristic amounts, which are calculated from pixel values of pixels that constitute the images within the judgment target regions;

the judging means executing the processes of:

classifying and recording formulas for calculating the plurality of characteristic amounts into N groups (N>1), such that the amount of calculations required to obtain characteristic amounts by formulas in a Kth group ($1 \leq K<N$) is less than the amount of calculations required to obtain characteristic amounts by formulas in a (K+1)th group;

outputting judgment results indicating that an image within a judgment target region does not represent the predetermined subject, in the case that it is judged that the image within the judgment target region does not represent the predetermined subject, based on characteristic amounts obtained by formulas in a Kth group;

performing judgment, based on characteristic amounts obtained by formulas in a (K+1)th group, in the case that it is judged that an image within a judgment target region represents the predetermined subject, based on characteristic amounts obtained by formulas in a Kth group; and outputting judgment results indicating that the image within the judgment target region represents the predetermined subject, in the case that it is judged that the image within the judgment target region represents the predetermined subject, based on characteristic amounts obtained by formulas in the Nth group.

15. A structural element detecting apparatus as defined in claim 14, wherein:

the judging means performs first judgment, based on the characteristic amounts obtained by formulas in a Kth group, with respect to a plurality of judgment target regions set by the target region setting means; and the judging means performs second judgment, based on the characteristic amounts obtained by formulas in a (K+1)th group, with respect to judgment target regions, which have been judged to represent structural elements by the first judgment.

16. A structural element detecting apparatus as defined in claim 14, wherein:

the judgment target regions are set such that the positions of judgment target regions closest to each other are shifted at least two pixels, during at least a portion of the judgments performed by the judging means.

17. A structural element detecting apparatus as defined in claim 16, wherein:

the judging means performs first judgment, based on the characteristic amounts obtained by formulas in a Kth group, with respect to the plurality of judgment target regions set by the target region setting means; and the judging means performs second judgment, based on the characteristic amounts obtained by formulas in a (K+1)th group, with respect to a plurality of judgment target regions, which are set such that at least a portion thereof overlaps with judgment target regions that have been judged to represent structural elements by the first judgment.

18. A structural element detecting apparatus as defined in claim 17, wherein:

at least one of the formulas for calculating characteristic amounts classified in a Kth group is also included in a (K+1)th group.

19. A structural element detecting apparatus as defined in claim 14, wherein:

the judging means performs first judgment, based on characteristic amounts obtained by formulas in a Kth group, with respect to judgment target regions, which are set within an image represented at a predetermined resolution; and the judging means performs second judgment, based on characteristic amounts obtained by formulas in a (K+1)th group, with respect to the judgment target regions, which are set within the image represented at a higher resolution than that of the first judgment.

20. A structural element detecting apparatus as defined in claim 19, wherein:

the judging means performs first judgment, based on the characteristic amounts obtained by formulas in a Kth group, with respect to the plurality of judgment target regions set by the target region setting means; and the judging means performs second judgment, based on the characteristic amounts obtained by formulas in a (K+1)th group, with respect to a plurality of judgment target regions, which are set such that at least a portion thereof overlaps with judgment target regions that have been judged to represent structural elements by the first judgment.

21. A structural element detecting apparatus as defined in claim 20, wherein:

at least one of the formulas for calculating characteristic amounts classified in a Kth group is also included in a (K+1)th group.

22. A structural element detecting apparatus as defined in claim 1, wherein:
the structural elements are eyes of living organisms.

23. A structural element detecting apparatus as defined in claim 22, wherein:
the colors of the eyes are abnormal colors.

24. A structural element detecting apparatus as defined in claim 22, wherein:
the predetermined subjects are faces of the living organisms.

25. The apparatus of claim 1, wherein the structural element candidates are in an interior part of the subjects detected by the subject detecting section.

26. A detecting apparatus, comprising:
target region setting means, for setting judgment target regions within an image; and
judging means, for judging whether images within the judgment target regions set by the target region setting means represent detection targets, based on a plurality of characteristic amounts, which are calculated from pixel values of pixels that constitute the images within the judgment target regions;
the judging means executing the processes of:
classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;
outputting judgment results indicating that an image within a judgment target region does not represent the detection targets, in the case that it is judged that the image within the judgment target region does not represent the detection targets, based on characteristic amounts obtained by formulas in a Kth group;
performing judgment, based on characteristic amounts obtained by formulas in a (K+1)th group, in the case that it is judged that an image within a judgment target region represents the detection targets, based on characteristic amounts obtained by formulas in a Kth group; and
outputting judgment results indicating that the image within the judgment target region represents the detection targets, in the case that it is judged that the image within the judgment target region represents the detection targets, based on characteristic amounts obtained by formulas in the Nth group.

27. A detecting apparatus as defined in claim 26, wherein:
the judging means performs first judgment, based on the characteristic amounts obtained by formulas in a Kth group, with respect to a plurality of judgment target regions set by the target region setting means; and
the judging means performs second judgment, based on the characteristic amounts obtained by formulas in a (K+1)th group, with respect to judgment target regions, which have been judged to represent structural elements by the first judgment.

28. A detecting apparatus as defined in claim 26, wherein:
the judgment target regions are set such that the positions of judgment target regions closest to each other are shifted at least two pixels, during at least a portion of the judgments performed by the judging means.

29. A detecting apparatus as defined in claim 28, wherein:
the judging means performs first judgment, based on the characteristic amounts obtained by formulas in a Kth group, with respect to the plurality of judgment target regions set by the target region setting means; and
the judging means performs second judgment, based on the characteristic amounts obtained by formulas in a (K+1)th group, with respect to a plurality of judgment target regions, which are set such that at least a portion thereof overlaps with judgment target regions that have been judged to represent structural elements by the first judgment.

30. A detecting apparatus as defined in claim 29, wherein:
at least one of the formulas for calculating characteristic amounts classified in a Kth group is also included in a (K+1)th group.

31. A detecting apparatus as defined in claim 26, wherein:
the judging means performs first judgment, based on characteristic amounts obtained by formulas in a Kth group, with respect to judgment target regions, which are set within an image represented at a predetermined resolution; and
the judging means performs second judgment, based on characteristic amounts obtained by formulas in a (K+1)th group, with respect to the judgment target regions, which are set within the image represented at a higher resolution than that of the first judgment.

32. A detecting apparatus as defined in claim 31, wherein:
the judging means performs first judgment, based on the characteristic amounts obtained by formulas in a Kth group, with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

33. A detecting apparatus as defined in claim 32, wherein:
at least one of the formulas for calculating characteristic amounts classified in a Kth group is also included in a (K+1)th group.

34. A structural element detecting method for detecting predetermined structural elements included in predetermined subjects from within images that include the subjects, comprising:
a first structural element candidate detecting process, for detecting structural element candidates by discriminating characteristics inherent to the predetermined structural elements, from among characteristics of the images;
a first subject detecting process, for detecting subjects that include the structural element candidates by discriminating characteristics inherent to the predetermined subjects, from among characteristics of the images in the vicinities of the structural element candidates; and
a structural element confirming process, for confirming that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within the subjects detected by the subject detecting section;
wherein the structural element confirming process performs discrimination, utilizing data regarding subjects detected by the subject detecting process;
wherein the number of structural element candidates, detected by a first structural element candidate detecting process and confirmed as being the predetermined structural elements, is compared against the maximum number of structural elements which are possibly included within the subjects detected by the subject detecting process;

a second structural element candidate detecting process, having a higher detection rate than the first structural element candidate detecting process, is executed in the case that number of structural element candidates, which have been detected by the first structural element candidate detecting process and confirmed to be structural elements by the structural element confirming section, is less than the maximum number; and the structural element confirming process is executed with respect to the structural element candidates which have been detected by the second structural element candidate detecting process, wherein at least one of the first structural element candidate detecting process, the first subject and second detecting processes, and the a structural element confirming process are performed by a processor.

35. A structural element detecting method as defined in claim 34, wherein:

a second subject detecting process, having different detection properties from that of a first subject detecting process, is executed in the case that the first subject detecting process does not detect a subject.

36. A structural element detecting method as defined in claim 35, wherein the second structural element candidate detecting process comprises:

a target region setting step, for setting judgment target regions within an image; and a judging step, for judging whether images within the judgment target regions set in the target region setting step represent structural elements, based on a plurality of characteristic amounts, which are calculated from pixel values of pixels that constitute the images within the judgment target regions;

the judging step comprising the processes of:

classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;

outputting judgment results indicating that an image within a judgment target region does not represent structural elements, in the case that it is judged that the image within the judgment target region does not represent structural elements, based on characteristic amounts obtained by formulas in a Kth group;

performing judgment, based on characteristic amounts obtained by formulas in a (K+1)th group, in the case that it is judged that an image within a judgment target region represents structural elements, based on characteristic amounts obtained by formulas in a Kth group; and outputting judgment results indicating that the image within the judgment target region represents structural elements, in the case that it is judged that the image within the judgment target region represents structural elements, based on characteristic amounts obtained by formulas in the Nth group.

37. A structural element detecting method as defined in claim 35, wherein the second subject detecting process comprises:

a target region setting step, for setting judgment target regions within an image; and a judging step, for judging whether images within the judgment target regions set in the target region setting step represent the predetermined subjects, based on a plurality of characteristic amounts, which are calculated from pixel values of pixels that constitute the images within the judgment target regions;

the judging step comprising the processes of:

classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;

outputting judgment results indicating that an image within a judgment target region does not represent the predetermined subject, in the case that it is judged that the image within the judgment target region does not represent the predetermined subject, based on characteristic amounts obtained by formulas in a Kth group;

performing judgment, based on characteristic amounts obtained by formulas in a (K+1)th group, in the case that it is judged that an image within a judgment target region represents the predetermined subject, based on characteristic amounts obtained by formulas in a Kth group; and outputting judgment results indicating that the image within the judgment target region represents the predetermined subject, in the case that it is judged that the image within the judgment target region represents the predetermined subject, based on characteristic amounts obtained by formulas in the Nth group.

38. A structural element detecting method as defined in claim 34, wherein:

the structural element confirming process confirms as the predetermined structural elements those structural element candidates which have characteristics inherent to structural elements of the same orientations as the orientations of subjects detected in the subject detecting process.

39. A structural element detecting method as defined in claim 34, wherein:

the structural element confirming process confirms as the predetermined structural elements those structural element candidates which have characteristics inherent to structural elements of sizes estimated from the sizes of subjects detected in the subject detecting process.

40. A structural element detecting method as defined in claim 34, wherein:

the structural element confirming process confirms the positions of structural elements, based on data obtained during the process of discriminating characteristics inherent to the predetermined structural elements, from among the characteristics of the images in the vicinity of the structural element candidates included in the subjects detected by the subject detecting process.

41. A structural element detecting method as defined in claim 34, wherein the first structural element candidate detecting process comprises:

a target region setting step, for setting judgment target regions within an image; and a judging step, for judging whether images within the judgment target regions set in the target region setting step represent structural elements, based on a plurality of characteristic amounts, which are calculated from pixel values of pixels that constitute the images within the judgment target regions;

the judging step comprising the processes of:

classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;

outputting judgment results indicating that an image within a judgment target region does not represent structural elements, in the case that it is judged that the image within the judgment target region does not represent structural elements, based on characteristic amounts obtained by formulas in a Kth group;

performing judgment, based on characteristic amounts obtained by formulas in a (K+1)th group, in the case that it is judged that an image within a judgment target region represents structural elements, based on characteristic amounts obtained by formulas in a Kth group; and outputting judgment results indicating that the image within the judgment target region represents structural elements, in the case that it is judged that the image within the judgment target region represents structural elements, based on characteristic amounts obtained by formulas in the Nth group.

42. A structural element detecting method as defined in claim 41, wherein:

first judgment, based on the characteristic amounts obtained by formulas in a Kth group, is performed with respect to a plurality of judgment target regions set in the target region setting step; and second judgment, based on the characteristic amounts obtained by formulas in a (K+1)th group, is performed with respect to judgment target regions, which have been judged to represent structural elements by the first judgment.

43. A structural element detecting method as defined in claim 41, wherein:

the judgment target regions are set such that the positions of judgment target regions closest to each other are shifted at least two pixels, during at least a portion of the judgments performed in the judging step.

44. A structural element detecting method as defined in claim 43, wherein:

first judgment, based on the characteristic amounts obtained by formulas in a Kth group, is performed with respect to the plurality of judgment target regions set in the target region setting step; and second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

45. A structural element detecting method as defined in claim 44, wherein:

at least one of the formulas for calculating characteristic amounts classified in a Kth group is also included in a (K+1)th group.

46. A structural element detecting method as defined in claim 41, wherein:

first judgment, based on characteristic amounts obtained by formulas in a Kth group, is performed with respect to judgment target regions, which are set within an image represented at a predetermined resolution; and second judgment, based on characteristic amounts obtained by formulas in a (K+1)th group, is performed with respect to the judgment target regions, which are set within the image represented at a higher resolution than that of the first judgment.

47. A structural element detecting method as defined in claim 46, wherein:

first judgment, based on the characteristic amounts obtained by formulas in a Kth group, is performed with respect to the plurality of judgment target regions set in the target region setting step; and second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

48. A structural element detecting method as defined in claim 47, wherein:

at least one of the formulas for calculating characteristic amounts classified in a Kth group is also included in a (K+1)th group.

49. A structural element detecting method as defined in claim 34, wherein the first subject detecting process comprises:

a target region setting step, for setting judgment target regions within an image; and a judging step, for judging whether images within the judgment target regions set in the target region setting step represent the predetermined subjects, based on a plurality of characteristic amounts, which are calculated from pixel values of pixels that constitute the images within the judgment target regions;

the judging step comprising the processes of:

classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;

outputting judgment results indicating that an image within a judgment target region does not represent the predetermined subject, in the case that it is judged that the image within the judgment target region does not represent the predetermined subject, based on characteristic amounts obtained by formulas in a Kth group;

performing judgment, based on characteristic amounts obtained by formulas in a (K+1)th group, in the case that it is judged that an image within a judgment target region represents the predetermined subject, based on characteristic amounts obtained by formulas in a Kth group; and outputting judgment results indicating that the image within the judgment target region represents the predetermined subject, in the case that it is judged that the image within the judgment target region represents the predetermined subject, based on characteristic amounts obtained by formulas in the Nth group.

50. A structural element detecting method as defined in claim 49, wherein:

first judgment, based on the characteristic amounts obtained by formulas in a Kth group, is performed with respect to a plurality of judgment target regions set in the target region setting step; and second judgment, based on the characteristic amounts obtained by formulas in a (K+1)th group, is performed with respect to judgment target regions, which have been judged to represent structural elements by the first judgment, in the subject detecting process.

51. A structural element detecting method as defined in claim 49, wherein:
the judgment target regions are set such that the positions of judgment target regions closest to each other are shifted at least two pixels, during at least a portion of the judgments performed in the judging step, in the subject detecting process.

52. A structural element detecting method as defined in claim 51, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment, in the subject detecting process.

53. A structural element detecting method as defined in claim 52, wherein:
at least one of the formulas for calculating characteristic amounts classified in a Kth group is also included in a (K+1)th group, in the subject detecting process.

54. A structural element detecting method as defined in claim 49, wherein:
first judgment, based on characteristic amounts obtained by formulas in a Kth group, is performed with respect to judgment target regions, which are set within an image represented at a predetermined resolution; and
second judgment, based on characteristic amounts obtained by formulas in a (K+1)th group, is performed with respect to the judgment target regions, which are set within the image represented at a higher resolution than that of the first judgment, in the subject detecting process.

55. A structural element detecting method as defined in claim 54, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment, in the subject detecting process.

56. A structural element detecting method as defined in claim 55, wherein:
at least one of the formulas for calculating characteristic amounts classified in a Kth group is also included in a (K+1)th group.

57. A structural element detecting method as defined in claim 34, wherein:
the structural elements are eyes of living organisms.

58. A structural element detecting method as defined in claim 57, wherein:
the colors of the eyes are abnormal colors.

59. A structural element detecting method as defined in claim 57, wherein:
the predetermined subjects are faces of the living organisms.

60. A detecting method, comprising:
a target region setting step, for setting judgment target regions within an image; and a judging step, for judging whether images within the judgment target regions set in the target region setting step represent detection targets, based on a plurality of characteristic amounts, which are calculated from pixel values of pixels that constitute the images within the judgment target regions;
the judging step executing the processes of:
classifying and recording formulas for calculating the plurality of characteristic amounts into N groups (N>1), such that the amount of calculations required to obtain characteristic amounts by formulas in a Kth group ((1 $\leq$K<N) is less than the amount of calculations required to obtain characteristic amounts by formulas in a (K+1) th group;
outputting judgment results indicating that an image within a judgment target region does not represent the detection targets, in the case that it is judged that the image within the judgment target region does not represent the detection targets, based on characteristic amounts obtained by formulas in a Kth group;
performing judgment, based on characteristic amounts obtained by formulas in a (K+1)th group, in the case that it is judged that an image within a judgment target region represents the detection targets, based on characteristic amounts obtained by formulas in a Kth group; and
outputting judgment results indicating that the image within the judgment target region represents the detection targets, in the case that it is judged that the image within the judgment target region represents the detection targets, based on characteristic amounts obtained by formulas in the Nth group;
wherein at least one of the target region setting and judging is performed by a processor.

61. A detecting method as defined in claim 60, wherein:
first judgment, based on the characteristic amounts obtained by formulas in a Kth group, is performed with respect to a plurality of judgment target regions set in the target region setting step; and
second judgment, based on the characteristic amounts obtained by formulas in a (K-I-1)th group, is performed with respect to judgment target regions, which have been judged to represent structural elements by the first judgment.

62. A detecting method as defined in claim 60, wherein:
the judgment target regions are set such that the positions of judgment target regions closest to each other are shifted at least two pixels, during at least a portion of the judgments performed in the judging step.

63. A detecting method as defined in claim 62, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

64. A detecting method as defined in claim 63, wherein:
at least one of the formulas for calculating characteristic amounts classified in a Kth group is also included in a (K+1)th group.

65. A detecting method as defined in claim 60, wherein:
first judgment, based on characteristic amounts obtained by formulas in a Kth group, is performed with respect to judgment target regions, which are set within an image represented at a predetermined resolution; and
second judgment, based on characteristic amounts obtained by formulas in a (K+1)th group, is performed with respect to the judgment target regions, which are set within the image represented at a higher resolution than that of the first judgment.

66. A detecting method as defined in claim 65, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

67. A detecting method as defined in claim 66, wherein:
at least one of the formulas for calculating characteristic amounts classified in a Kth group is also included in a (K+1)th group.

68. A computer readable recording medium having a program that provides a function of detecting predetermined structural elements included in predetermined subjects from within images that include the subjects, the program causing a computer to execute:
first structural element candidate detecting process, for detecting structural element candidates by discriminating characteristics inherent to the predetermined structural elements, from among characteristics of the images;
a first subject detecting process, for detecting subjects that include the structural element candidates by discriminating characteristics inherent to the predetermined subjects, from among characteristics of the images in the vicinities of the structural element candidates; and
a structural element confirming process, for confirming that the structural element candidates are the predetermined structural elements, by discriminating characteristics inherent to the predetermined structural elements with a higher degree of accuracy than that of the structural element candidate detecting section, from among the characteristics of the images in the vicinities of the structural element candidates, which are included within the subjects detected by the subject detecting section;
wherein the structural element confirming process performs discrimination, utilizing data regarding subjects detected by the subject detecting process;
wherein the number of structural element candidates, detected by a first structural element candidate detecting process and confirmed as being the predetermined structural elements, is compared against the maximum number of structural elements which are possibly included within the subjects detected by the subject detecting section;
a second structural element candidate detecting process, having a higher detection rate than the first structural element candidate detecting process, is executed in the case that number of structural element candidates, which have been detected by the first structural element candidate detecting process and confirmed to be structural elements by the structural element confirming section, is less than the maximum number; and
the structural element confirming process is executed with respect to the structural element candidates which have been detected by the second structural element candidate detecting process.

69. A recording medium as defined in claim 68, wherein the program recorded therein causes a computer to execute:
a second subject detecting process, having different detection properties from that of a first subject detecting process, in the case that the first subject detecting process does not detect a subject.

70. A structural element detecting method as defined in claim 69, wherein the second structural element candidate detecting process comprises:
a target region setting step, for setting judgment target regions within an image; and
a judging step, for judging whether images within the judgment target regions set in the target region setting step represent structural elements, based on a plurality of characteristic amounts, which are calculated from pixel values of pixels that constitute the images within the judgment target regions;
the judging step comprising the processes of:
classifying and recording formulas for calculating the plurality of characteristic amounts into N groups (N>1), such that the amount of calculations required to obtain characteristic amounts by formulas in a Kth group (1≦K<N) is less than the amount of calculations required to obtain characteristic amounts by formulas in a (K+1)th group;
outputting judgments results indicating that an image within a judgment target region does not represent structural elements, in the case that it is judged that the image within the judgment target region does not represent structural elements, based on characteristic amounts obtained by formulas in a Kth group;
performing judgment, based on characteristic amounts obtained by formulas in a (K+1)th group, in the case that it is judged that an image within a judgment target region represents structural elements, based on characteristic amounts obtained by formulas in a Kth group; and
outputting judgment results indicating that the image within the judgment target region represents structural elements, in the case that it is judged that the image within the judgment target region represents structural elements, based on characteristic amounts obtained by formulas in the Nth group.

71. A recording medium as defined in claim 68, wherein:
the structural element confirming process confirms as the predetermined structural elements those structural element candidates which have characteristics inherent to structural elements of the same orientations as the orientations of subjects detected in the subject detecting process.

72. A recording medium as defined in claim 68, wherein:
the structural element confirming process confirms as the predetermined structural elements those structural element candidates which have characteristics inherent to structural elements of sizes estimated from the sizes of subjects detected in the subject detecting process.

73. A recording medium as defined in claim 68, wherein:
the structural element confirming process confirms structural element candidates as structural elements, based on data obtained during the process of discriminating characteristics inherent to pupils that have regions displayed red, from among the characteristics of the images in the vicinity of the structural element candidates included in the subjects detected by the subject detecting process.

74. A recording medium as defined in claim 68, wherein the first structural element candidate detecting process comprises:
a target region setting step, for setting judgment target regions within an image; and
a judging step, for judging whether images within the judgment target regions set in the target region setting step represent structural elements, based on a plurality of characteristic amounts, which are calculated from pixel values of pixels that constitute the images within the judgment target regions;
the judging step comprising the processes of:
classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;
outputting judgment results indicating that an image within a judgment target region does not represent structural elements, in the case that it is judged that the image within the judgment target region does not represent structural elements, based on characteristic amount obtained by formulas in a Kth group;
performing judgment, based on characteristic amounts obtained by formulas in a (K+1)th group, in the case that it is judged that an image within a judgment target region represents structural elements, based on characteristics amounts obtained by formulas in a Kth group; and
outputting judgment results indicating that the image within the judgment target region represents structural elements, in the case that it is judged that image within the judgment target region represents structural elements, based on characteristic amounts obtained by formulas in the Nth group.

75. A recording medium as defined in claim 74, wherein:
first judgment, based on the characteristic amounts obtained by formulas in a Kth group, is performed with respect to a plurality of judgment target regions set in the target region setting step; and
second judgment, based on the characteristic amounts obtained by formulas in a (K+1)th group, is performed with respect to judgment target regions, which have been judged to represent structural elements by the first judgment.

76. A recording medium as defined in claim 74, wherein:
the judgment target regions are set such that the positions of judgment target regions closest to each other are shifted at least two pixels, during at least a portion of the judgments performed in the judging step.

77. A recording medium as defined in claim 76, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

78. A recording medium as defined in claim 77, wherein:
at least one of the formulas for calculating characteristic amounts classified in a Kth group is also included in a (K+1)th group.

79. A recording medium as defined in claim 74, wherein:
first judgment, based on characteristic amounts obtained by formulas in a Kth group, is performed with respect to judgment target regions, which are set within an image represented at a predetermined resolution; and
second judgment, based on characteristic amounts obtained by formulas in a (K+1)th group, is performed with respect to the judgment target regions, which are set within the image represented at a higher resolution than that of the first judgment.

80. A recording medium as defined in claim 79, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

81. A recording medium as defined in claim 80, wherein:
at least one of the formulas for calculating characteristic amounts classified in a Kth group is also included in a (K+1)th group.

82. A recording medium as defined in claim 68, wherein the first subject detecting process comprises:
a target region setting step, for setting judgment target regions within an image; and
a judging step, for judging whether images within the judgment target regions set in the target region setting step represent the predetermined subjects, based on a plurality of characteristic amounts, which are calculated from pixel values of pixels that constitute the images within the judgment target regions;
the judging step comprising the processes of:
classifying and recording formulas for calculating the plurality of characteristic amounts into N groups (N>1), such that the amount of calculations required to obtain characteristic amounts by formulas in a Kth group ($1 \leq K < N$) is less than the amount of calculations required to obtain characteristic amounts by formulas in a (K+1)th group;
outputting judgment results indicating that an image within a judgment target region does not represent the predetermined subject, in the case that it is judged that the image within the judgment target region does not represent the predetermined subject, based on characteristic amounts obtained by formulas in a Kth group;
performing judgment, based on characteristic amounts obtained by formulas in a (K+1)th group, in the case that it is judged that an image within a judgment target region represents the predetermined subject, based on characteristic amounts obtained by formulas in a Kth group; and
outputting judgment results indicating that the image within the judgment target region represents the predetermined subject, in the case that it is judged that the image within the judgment target region represents the predetermined subject, based on characteristic amounts obtained by formulas in the Nth group.

83. A recording medium as defined in claim 82, wherein:
first judgment, based on the characteristic amounts obtained by formulas in a Kth group, is performed with respect to a plurality of judgment target regions set in the target region setting step; and
second judgment, based on the characteristic amounts obtained by formulas in a (K+1)th group, is performed with respect to judgment target regions, which have been judged to represent structural elements by the first judgment, in the subject detecting process.

84. A recording medium as defined in claim 82, wherein:
the judgment target regions are set such that the positions of judgment target regions closest to each other are shifted at least two pixels, during at least a portion of the judgments performed in the judging step, in the subject detecting process.

85. A recording medium as defined in claim 84, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment, in the subject detecting process.

86. A recording medium as defined in claim 85, wherein:
at least one of the formulas for calculating characteristic amounts classified in a Kth group is also included in a (K+1)th group, in the subject detecting process.

87. A recording medium as defined in claim 82, wherein:
first judgment, based on characteristic amounts obtained by formulas in a Kth group, is performed with respect to judgment target regions, which are set within an image represented at a predetermined resolution; and
second judgment, based on characteristic amounts obtained by formulas in a (K+1)th group, is performed with respect to the judgment target regions, which are set within the image represented at a higher resolution than that of the first judgment, in the subject detecting process.

88. A recording medium as defined in claim 87, wherein:
first judgment, based on the characteristic amounts obtained by formulas in a Kth group, is performed with respect to the plurality of judgment target regions set in the target region setting step; and
second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment, in the subject detecting process.

89. A recording medium as defined in claim 88, wherein:
at least one of the formulas for calculating characteristic amounts classified in a Kth group is also included in a (K+1)th group.

90. A recording medium as defined in claim 68, wherein the second subject detecting process comprises:
a target region setting step, for setting judgment target regions within an image; and
a judging step, for judging whether images within the judgment target regions set in the target region setting step represent the predetermined subjects, based on a plurality of characteristic amounts, which are calculated from pixel values of pixels that constitute the images within the judgment target regions;
the judging step comprising the processes of:
classifying and recording formulas for calculating the plurality of characteristic amounts into N groups (N>1), such that the amount of calculations required to obtain characteristic amounts by formulas in a Kth group ($1 \leq K<N$) is less than the amount of calculations required to obtain characteristic amounts by formulas in a (K+1)th group;
outputting judgment results indicating that an image within a judgment target region does not represent the predetermined subject, in the case that it is judged that the image within the judgment target region does not represent the predetermined subject, based on characteristic amounts obtained by formulas in a Kth group;
performing judgment, based on characteristic amounts obtained by formulas in a (K+1)th group, in the case that it is judged that an image within a judgment target region represents the predetermined subject, based on characteristic amounts obtained by formulas in a Kth group; and
outputting judgment results indicating that the image within the judgment target region represents the predetermined subject, in the case that it is judged that the image within the judgment target region represents the predetermined subject, based on characteristic amounts obtained by formulas in the Nth group.

91. A recording medium as defined in claim 68, wherein:
the structural elements are eyes of living organisms.

92. A recording medium as defined in claim 91, wherein:
the colors of the eyes are abnormal colors.

93. A recording medium as defined in claim 91, wherein:
the predetermined subjects are faces of the living organisms.

94. A computer readable recording medium having a program that provides a function of detecting detection targets included in judgment target regions, the program causing a computer to execute:
a target region setting step, for setting the judgment target regions within an image; and
a judging step, for judging whether images within the judgment target regions set in the target region setting step represent detection targets, based on a plurality of characteristic amounts, which are calculated from pixel values of pixels that constitute the images within the judgment target regions;
the judging step executing the processes of:
classifying and recording formulas for calculating the plurality of characteristic amounts into N groups (N>1), such that the amount of calculations required to obtain characteristic amounts by formulas in a Kth group ($1 \leq K<N$) is less than the amount of calculations required to obtain characteristic amounts by formulas in a (K+1)th group;
outputting judgment results indicating that an image within a judgment target region does not represent the detection targets, in the case that it is judged that the image within the judgment target region does not represent the detection targets, based on characteristic amounts obtained by formulas in a Kth group;
performing judgment, based on characteristic amounts obtained by formulas in a (K+1)th group, in the case that it is judged that an image within a judgment target region represents the detection targets, based on characteristic amounts obtained by formulas in a Kth group; and
outputting judgment results indicating that the image within the judgment target region represents the detection targets, in the case that it is judged that the image within the judgment target region represents the detection targets, based on characteristic amounts obtained by formulas in the Nth group.

95. A recording medium as defined in claim 94, wherein:

first judgment, based on the characteristic amounts obtained by formulas in a Kth group, is performed with respect to a plurality of judgment target regions set in the target region setting step; and second judgment, based on the characteristic amounts obtained by formulas in a (K+1)th group, is performed with respect to judgment target regions, which have been judged to represent structural elements by the first judgment.

96. A recording medium as defined in claim 94, wherein:

the judgment target regions are set such that the positions of judgment target regions closest to each other are shifted at least two pixels, during at least a portion of the judgments performed in the judging step.

97. A recording medium as defined in claim 96, wherein:

first judgment, based on the characteristic amounts obtained by formulas in a Kth group, is performed with respect to the plurality of judgment target regions set in the target region setting step; and second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

98. A recording medium as defined in claim 97, wherein:

at least one of the formulas for calculating characteristic amounts classified in a Kth group is also included in a (K+1)th group.

99. A recording medium as defined in claim 94, wherein:

first judgment, based on characteristic amounts obtained by formulas in a Kth group, is performed with respect to judgment target regions, which are set within an image represented at a predetermined resolution; and second judgment, based on characteristic amounts obtained by formulas in a (K+1)th group, is performed with respect to the judgment target regions, which are set within the image represented at a higher resolution than that of the first judgment.

100. A recording medium as defined in claim 99, wherein:

first judgment, based on the characteristic amounts obtained by formulas in a Kth group, is performed with respect to the plurality of judgment target regions set in the target region setting step; and second judgment, based on the characteristic amounts obtained by formulas in a (K+1)th group, is performed with respect to a plurality of judgment target regions, which are set such that at least a portion thereof overlaps with judgment target regions that have been judged to represent structural elements by the first judgment.

101. A recording medium as defined in claim 100, wherein:

at least one of the formulas for calculating characteristic amounts classified in a Kth group is also included in a (K+1)th group.

\* \* \* \* \*